US011706182B2

(12) United States Patent
Krishnamurthy et al.

(10) Patent No.: US 11,706,182 B2
(45) Date of Patent: *Jul. 18, 2023

(54) LOCAL CONTENT PUBLISHING

(71) Applicant: Reputation.com, Inc., Redwood City, CA (US)

(72) Inventors: Sathya Krishnamurthy, Fremont, CA (US); Shiv Prakash, Redwood City, CA (US); Manish Balsara, Foster City, CA (US); Yu Fang, Sunnyvale, CA (US); Shrey A. Bhatia, Los Altos, CA (US)

(73) Assignee: Reputation.com, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,409

(22) Filed: Dec. 18, 2020

(65) Prior Publication Data

US 2021/0105245 A1 Apr. 8, 2021

Related U.S. Application Data

(63) Continuation of application No. 15/298,134, filed on Oct. 19, 2016, now Pat. No. 10,938,768.

(60) Provisional application No. 62/247,406, filed on Oct. 28, 2015.

(51) Int. Cl.

| | |
|---|---|
| ***H04L 51/52*** | (2022.01) |
| ***H04L 67/52*** | (2022.01) |
| *G06Q 50/00* | (2012.01) |

(52) U.S. Cl.

CPC .............. *H04L 51/52* (2022.05); *H04L 67/52* (2022.05); *G06Q 50/01* (2013.01)

(58) Field of Classification Search

None

See application file for complete search history.

(56) References Cited

U.S. PATENT DOCUMENTS

| | | | |
|---|---|---|---|
| 6,205,431 | B1 | 3/2001 | Willemain |
| 8,473,347 | B1 | 6/2013 | Koningstein |
| 8,909,771 | B2 | 12/2014 | Heath |
| 8,965,901 | B2 | 2/2015 | Merriman |
| 9,147,202 | B1 | 9/2015 | Muse |
| 9,549,212 | B2 | 1/2017 | Evans |

(Continued)

FOREIGN PATENT DOCUMENTS

| | | |
|---|---|---|
| EP | 2410704 | 1/2012 |
| JP | 4394642 | 1/2010 |

(Continued)

OTHER PUBLICATIONS

Author Unknown, Social Media & Enterprise Content Management (ECM), Jul. 21, 2014, https://nedocs.com/social-media-and-ecm/.

*Primary Examiner* — Mohamed A. Wasel

*Assistant Examiner* — Gregory P Tolchinsky

(74) *Attorney, Agent, or Firm* — Van Pelt, Yi & James LLP

(57) ABSTRACT

Local content publishing is disclosed. A queue is obtained. The queue is associated with a geographical region. A set of entities is determined based at least in part on the geographical region associated with the queue. A piece of content assigned to the queue is obtained. The piece of content is published on behalf of the set of entities determined based at least in part on the geographical region associated with the queue.

21 Claims, 19 Drawing Sheets

1400

(56) References Cited

U.S. PATENT DOCUMENTS

| | | | | |
|---|---|---|---|---|
| 9,633,021 | B2 | 4/2017 | Caruso | |
| 9,672,492 | B2 | 6/2017 | Peak | |
| 10,127,564 | B2 | 11/2018 | Heath | |
| 10,140,620 | B2 | 11/2018 | Heath | |
| 10,445,286 | B1 * | 10/2019 | Nijim | H04N 21/44222 |
| 10,679,246 | B2 | 6/2020 | Hicken | |
| 2001/0054087 | A1 | 12/2001 | Flom | |
| 2002/0042817 | A1 * | 4/2002 | Lahr | H04N 21/6405 709/213 |
| 2003/0120593 | A1 * | 6/2003 | Bansal | H04L 67/327 705/36 R |
| 2006/0085299 | A1 | 4/2006 | Goll | |
| 2006/0200412 | A1 | 9/2006 | Fahrny | |
| 2006/0229940 | A1 | 10/2006 | Grossman | |
| 2007/0294281 | A1 | 12/2007 | Ward | |
| 2009/0037970 | A1 | 2/2009 | Chen | |
| 2009/0150518 | A1 | 6/2009 | Lewin | |
| 2010/0211453 | A1 | 8/2010 | Huang | |
| 2011/0165888 | A1 * | 7/2011 | Shuman | H04W 4/02 455/456.1 |
| 2012/0245963 | A1 | 9/2012 | Peak | |
| 2012/0331051 | A1 | 12/2012 | Bhattacharya | |
| 2013/0014222 | A1 | 1/2013 | Bhatia | |
| 2013/0073388 | A1 | 3/2013 | Heath | |
| 2013/0339519 | A1 | 12/2013 | Lientz | |
| 2014/0006930 | A1 | 1/2014 | Hollis | |
| 2014/0081880 | A1 | 3/2014 | Estes, Jr. | |
| 2014/0143050 | A1 | 5/2014 | Boland | |
| 2014/0229544 | A1 | 8/2014 | Evans | |
| 2014/0359092 | A1 | 12/2014 | Middleton | |
| 2015/0081426 | A1 | 3/2015 | Walk | |
| 2015/0095154 | A1 | 4/2015 | Kannan | |
| 2015/0149600 | A1 | 5/2015 | Thibeault | |
| 2015/0161565 | A1 | 6/2015 | Kraft | |
| 2015/0324336 | A1 | 11/2015 | Glezos | |
| 2015/0371341 | A1 | 12/2015 | Iyer | |
| 2019/0164175 | A1 | 5/2019 | Dilling | |
| 2019/0259107 | A1 | 8/2019 | Hollis | |

FOREIGN PATENT DOCUMENTS

| | | |
|---|---|---|
| WO | 2014005231 | 1/2014 |
| WO | 2014059426 | 4/2014 |
| WO | 2014160380 | 10/2014 |

* cited by examiner

```
BEGIN curation(C, I)
        foreach day D from D0 ... Dn
             foreach tenant T in given industry I
                  foreach consumer C in T
                       conReq cR := getConsumerReq(T, C, D)
                       stock sT := getStock(cR)
                       if stock != null
                           publish stock
                       else
                          save exception reason in consumerInventory table
                  endfor
             endfor
        endfor
END
```

FIG. 8

```
BEGIN getStock ( consumerReq cR )
    if stockTable has stock that matches request then
        return stock
    else
        raiseDemand(cR)
    endif
END
```

FIG. 9

```
BEGIN raiseDemand(consumerReq cR)
     nghs := findAllNeighbors( cR->locationId)
     grps := findOpenGroup(cR->tenantId, cR->locationID, cR->publishOn, cR->tagId, nghs)
     if null != grps
        then pick at random grp from grps
        if exists stock in grp
           then return stock
        else
           return null
        endif
     else
        create new grp
        if exists stock that does not belong to any grp && satisfies cr->tagId, cR->publishOn
           then return stock
        else
           raise demand in demand table for [cR->tagId, cR->publishOn]
        endif
     endif
END
```

FIG. 10

DENT DETROIT – SOCIAL CURATION HISTORY

Sign Out

| DATE | POSTING |
|---|---|
| 1-Jan | [TWITTER, FACEBOOK] HAPPY NEW YEAR! |
| 3-Jan | [FACEBOOK] A new year is a great time to think about improving your dental hygiene. The following are top ten tips….. VIEW DETAILS |
| 7-Jan | [TWITTER] If you need a pick me up, check out this funny cat video. http://….. VIEW DETAILS |
| … | |

1100

```
BEGIN randomlySelectLocations(N, L, A)
    foreach location from L selected by random number
        remove location from L
        allocated := false
        foreach alloc a from A
            if a->locationID := location->id
                allocated := true
        endfor
        if allocated := false
            save location in selectedLocations
        else doNothing
        if selectedLocations->size == N
            break
    endfor
END
```

FIG. 15

```
BEGIN publishLocalContent(T, S, D)
   foreach tenant T from T
      get locations from T
      foreach stock from S
         get unallocated locations: lc
         calculate stock's remaining active days: daysToExpiration
         numLocationsToAllocateToday := lc->size / daysToExpiration
         get today's allocation: todaysAllocations
         publishLocations := randomlySelectLocations(numLocationsToAllocateToday, lc, todaysAllocations)
         scheduledPostID := publishPost(tenant->id, stock, publishLocations, D)
         if scheduledPostID != null
            save local content allocation with scheduledPostID
         else
            save local content allocation with exception
      endfor
   endfor
END
```

FIG. 16

Add Content Variant

Post Copy — 1902
Insert location-specific information into your posts using variables. See Details

[f] [g+] Facebook & Google+

Acme Performance unleashed some awesome surpises last week, and we've got more big news just around the corner. Take a sneak peek at the Acme Focal GT, and mark your calendars for the reveal on 2/3/15.
http://bit.ly/1zw17oe

[t] Twitter posts are limited to 140 characters. — 1904
You can edit the Twitter version of you post here.

Acme Performance unleashed some awesome surpises last week, and we've got more big news just around the corner. Take a sneak peek at the Acme 0 characters left ☐ Short URLs — 1906

Link Post | Image Post

Title
Description 1 of 4
☐ No image
upload custom image — 1908

⊕ Add Content — 1910

Tags
[Automotive ×] [2016 ×] [Cars ×] — 1912
[Trucks ×] [Eco-friendly ×] — 1914

Campaign
[Select Campaign ▸] — 1916

Visible to
[All Locations ▸]

[× Cancel] [✓ Save] — 1918

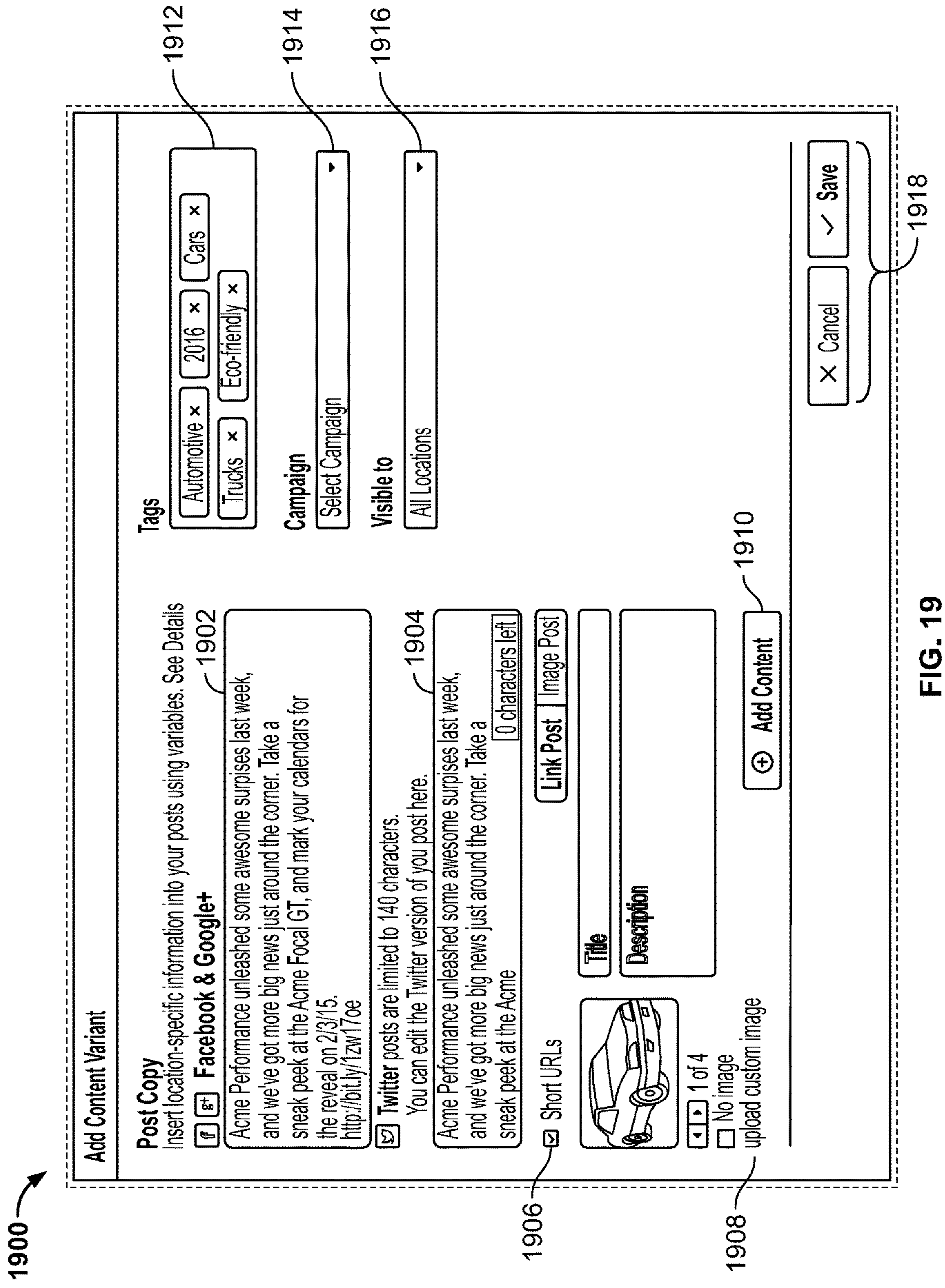

FIG. 19

LOCAL CONTENT PUBLISHING

CROSS REFERENCE TO OTHER APPLICATIONS

This application is a continuation of U.S. patent application Ser. No. 15/298,134, entitled LOCAL CONTENT PUBLISHING filed Oct. 19, 2016 which is incorporated herein by reference for all purposes, which claims priority to U.S. Provisional Application No. 62/247,406, entitled LOCAL CONTENT PUBLISHING filed Oct. 28, 2015 which is incorporated herein by reference for all purposes.

BACKGROUND OF THE INVENTION

Businesses are increasingly using services such as social media networks to reach existing/new customers, instead of/in addition to relying on traditional communication methods such as physical mailings and advertisement placements in telephone books. One aspect of participating in a social media network is that in order for a business's account to appear active (and of potential ongoing interest to customers), the business needs to periodically post content or otherwise interact with the social media network. Unfortunately, providing ongoing content to a social media network that is relevant to the business can be time-consuming and frustrating.

BRIEF DESCRIPTION OF THE DRAWINGS

Various embodiments of the invention are disclosed in the following detailed description and the accompanying drawings.

FIG. 8 illustrates an example of pseudocode for posting social content and determining demand.

FIG. 9 illustrates an example of pseudocode for stock manager logic.

FIG. 10 illustrates an example of pseudocode for a process usable to determine group membership.

FIG. 15 illustrates an example of pseudocode for selecting locations.

FIG. 16 illustrates an example of pseudocode for allocating stock to locations.

FIG. 19 illustrates an example embodiment of an interface for configuring content variants.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
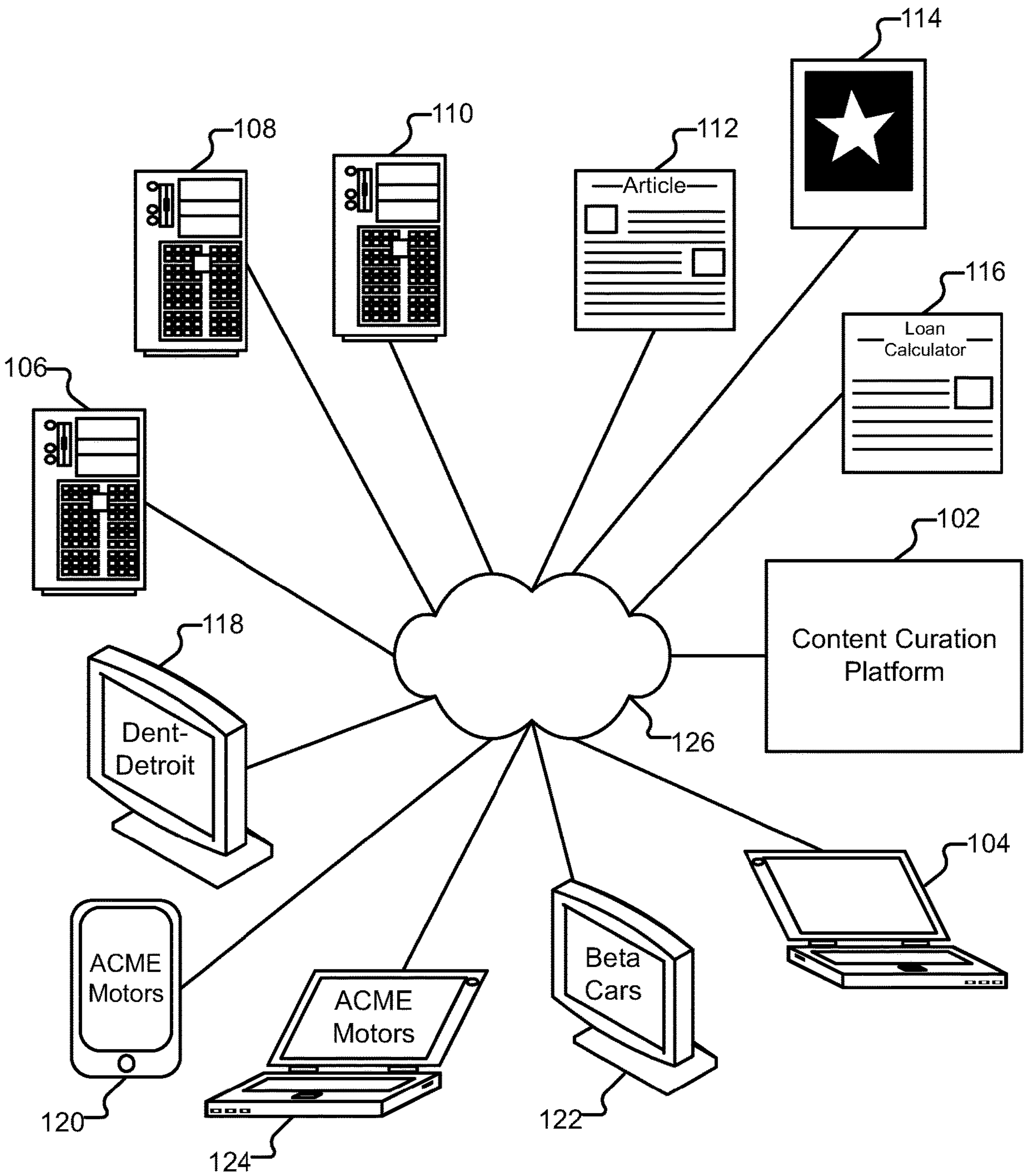
FIG. 1 illustrates an embodiment of an environment in which content curation is performed.

FIG. 1 illustrates an embodiment of an environment in which content curation is performed. In the example of FIG. 1, client devices 118-124 are operated by a variety of business owners (or other appropriate representatives of businesses/organizations/etc., as applicable). Client devices 118-124 can be used to directly post content to any/all of social networking services 106-110 (via one or more networks depicted collectively in FIG. 1 as network 126). For example, suppose client device 118 is a desktop computer located at a dentist's office. The dentist's office (hereinafter referred to as "Dent-Detroit") has set up accounts with each of social networking services 106-110. The office manager at Dent-Detroit occasionally posts content to the various social networking services, using web interfaces made available by the respective social networking services. For example, when a new employee joins the Dent-Detroit practice, the office manager will write a short welcome note and publish the note along with the new employee's photograph on Facebook (106). As another example, suppose Dent-Detroit has an annual holiday party for all of its patients. Selected photographs taken at the party are posted by the office manager to Instagram (108). Finally, while Dent-Detroit set up an account with Twitter (110) over one year ago, the office manager is unsure of what sort of content to publish to Twitter, and so the account has only a handful of tweets, with content such as "remember to brush your teeth!"

Suppose a prospective new dental patient, hereinafter referred to as "Bob Jones," has recently moved to Detroit, and is trying to locate a dentist. Historically (i.e., before the existence of services 106-110), Bob might have consulted a phonebook, kept an eye out for advertisements, and/or asked a friend/neighbor for dentist recommendations. Now, Bob will most likely use his phone, computer, tablet (or other appropriate consumer electronic device) to perform a web search for dentists in Detroit (whether using a general purpose search site, such as www.google.com or www.bing.com, or a more specific type of search site, such as an industry specific or review site).

The presence (or absence) of postings by Dent-Detroit on services 106-110 can impact Bob's ultimate decision to become a patient of Dent-Detroit in a variety of ways. For example, the position of Dent-Detroit in search results Bob receives will likely change based on how active Dent-Detroit is in posting content to services 106-110. Further, assuming Bob receives results about Dent-Detroit in response to his search, he will likely visit at least one of services 106-110 to learn more about Dent-Detroit. Bob's impression of the Dent-Detroit will likely vary based on Bob's perception of how "active" or "stale" the content posted is, as well as how topical it is. For example, thus far, Dent-Detroit has made very few, sporadic postings to services 106-110. Depending on when Bob visits any of services 106-110, it could be the case that the last content provided by Dent-Detroit to the respective service is six months old (or more). If Bob visits a different dentist's pages (on services 106-110), where that dentist has more current postings than Dent-Detroit, Bob might view that other dentist more favorably and give his business to that other dentist accordingly.

As will be described in more detail below, Dent-Detroit can use content curation platform 102 to automatically post relevant content to any/all of services 106-110 on a daily basis (or on any other, configurable schedule). The techniques described herein can also be used with other social networking services/platforms, such as Google+, and with other forms of communication, as applicable, such as sending text or instant messages, or emails.

Other businesses (including those in other industries) can also use platform 102. For example, suppose client device 120 is a tablet that belongs to the manager of a first Detroit car dealership ("ACME Motors of Detroit"). Client device 122 is a desktop computer belonging to a second Detroit car dealership ("Detroit Beta Cars"). Client device 124 is a laptop computer belonging to an ACME Motors dealer located in Cleveland ("ACME Motors of Cleveland"). As with Dent-Detroit, each of the three car dealers can use content curation platform 102 to automatically post relevant content to their respective social networking accounts.

As will be described in more detail below, content curation platform 102 is configured to apply a variety of rules when determining what content to post to which account, and when. For example, content curation platform 102 can ensure that the same piece of content (e.g., a particular news article offering summer driving tips) is unlikely to be repeatedly viewed by the same individual across multiple business's social networking pages. So, for example, if "Dave," is an individual shopping for a new car in Detroit, he will encounter the summer driving tip article via only one of the two Detroit car dealers' social networking presences, if platform 102 enforces a distance rule limiting who can use a given piece of content within a given industry.

As will be described in more detail below, some rules are applicable to content, irrespective of which accounts the content will be posted on behalf of Examples of such rules include rules governing the earliest date a piece of content can be used (also referred to herein as an "embargo date"), the latest date a piece of content can be used (also referred to herein as an "expiration date"), and the total number of times a piece of content can be posted (i.e., used by platform 102 for different businesses). Some rules take into consideration the industry (or other classification) of the business using the content. As one example, content curation platform 102 can employ as a rule that no car dealership should use, within a ten day period, the same content as another car dealership. So, if a particular piece of content (e.g., loan calculator 116) is selected by platform 102 for posting to the account of Beta Cars on January 1, platform 102 will not post the same content to ACME Motors of Detroit within ten days of January 1. Platform 102 could post the loan calculator on behalf of ACME Motors of Detroit on/after January 11. As will be explained in more detail below, platform 102 could post the loan calculator on behalf of ACME Motors of Cleveland at any time (including on January 1 or within ten days of January 1) because Cleveland is more than fifty miles from Detroit (i.e., is sufficiently physically far away from Beta Cars that an individual viewing Beta Cars' social networking presence will be unlikely to also view ACME Motors of Cleveland's social networking presence).

As will be described in more detail below, content curation platform 102 can identify the types of content needed to fulfill its posting obligations on behalf of its subscribers (who also referred to herein as "tenants"). The platform makes available an interface that allows a content collector (e.g., an individual working on behalf of content curation platform 102) to see what content needs to be collected, in a given timeframe, and to submit that content to platform 102. For example (and as described in more detail below), using an interface made available via platform 102, a content collector (hereinafter referred to as "Charlie") using laptop 104 can be instructed to locate eleven pieces of content related to "automotive news," four pieces of content related to "kid-friendly fun," and six pieces of content related to "banking." Individual pieces of content available for use by platform 102 are also referred to herein as "stock."

Content provided by a content collector to platform 102 can take a variety of forms. One example of content is an article 112 (e.g., authored by a third party and accessible via a public URL). Another example of content is a picture 114 (e.g., accessible via a public URL). Yet another example of content is a tool/web-provided application 116 (e.g., accessible via a public URL), such as a car loan calculator. In addition to providing content curation platform 102 with links (URLs) to third party content, content curators can also, as applicable, supply self-generated content. As one example, if, around Valentine's Day, content curation platform 102 indicates a need for three pieces of seasonal content, Charlie could draw one or more images featuring hearts and upload them to platform 102. Charlie could similarly compose messages, such as "Happy Valentine's Day!" for submission to platform 102.

Tenant Setup

In the following example, suppose that Dent-Detroit has decided to begin using services provided by content curation platform 102. The office manager at Dent-Detroit (hereinafter referred to as "Alice") visits an interface made available by content curation platform 102 (e.g., using client device 118) and creates an account for the Dent-Detroit business. As part of the account setup process, she is asked to provide general information about the business, including its address (e.g., 123 Main Street, Detroit) and industry (e.g., dentistry). Alice is also asked for information pertinent to Dent-Detroit's social networking accounts, such as the username/password of the accounts. In some embodiments, instead of/in addition to being asked to supply a password, Alice is asked to authorize platform 102 to make postings on behalf of Dent-Detroit through another mechanism, such as OAuth.

Figure 2:
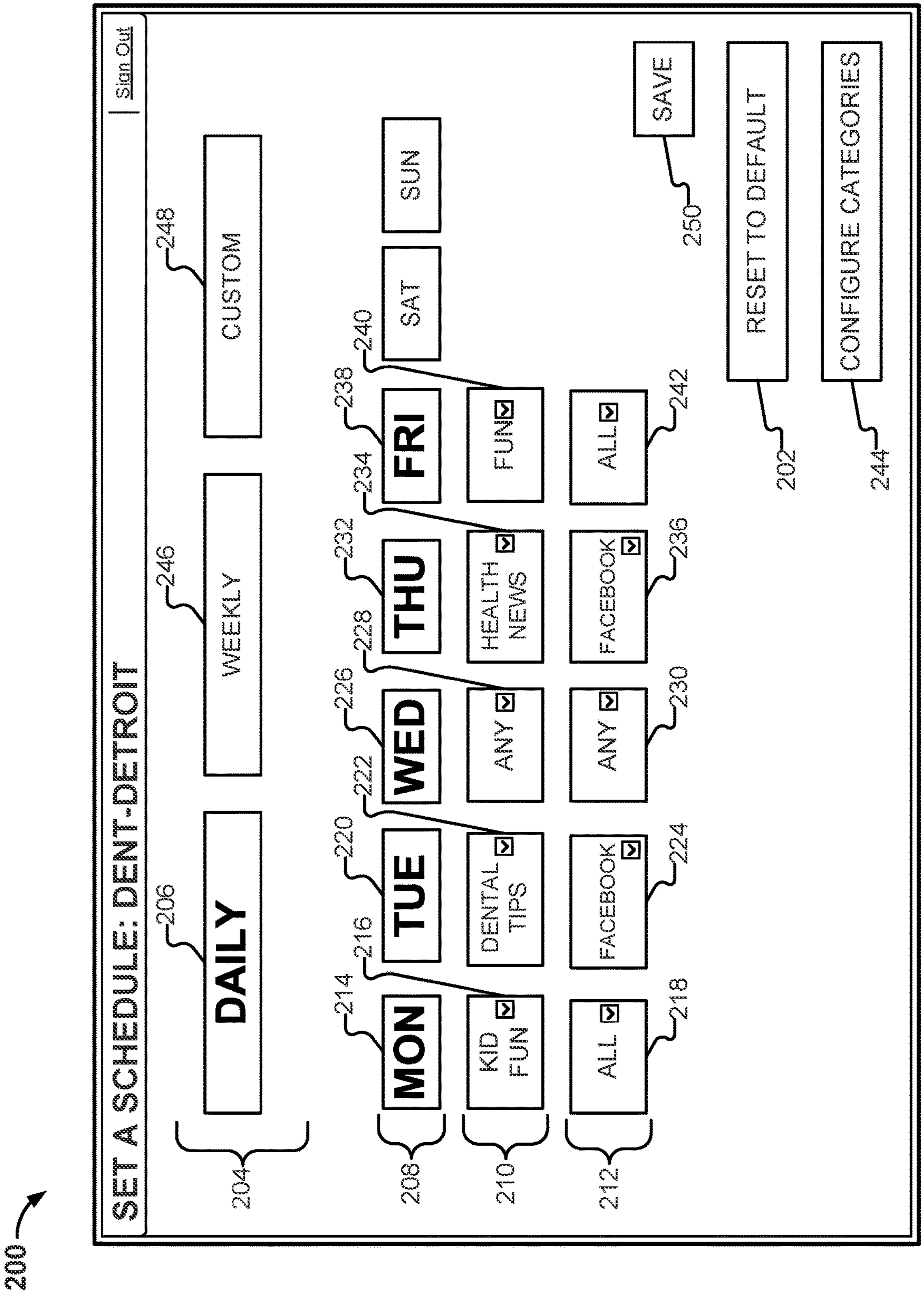
FIG. 2 illustrates an embodiment of a scheduling interface as rendered in a browser.

Alice is also asked to indicate how often postings should be made and what types of content should be posted on behalf of Dent-Detroit. FIG. 2 illustrates an embodiment of a scheduling interface as rendered in a browser. In particular, Alice is presented with interface 200 in conjunction with setting up an account on platform 102. Alice can revisit interface 200 after the Dent-Detroit account is created to make changes as desired.

By interacting with interface 200, Alice can specify how frequently content should be published to Dent-Detroit's various social networking accounts. In various embodiments, a default suggested schedule for posting social content is presented to Alice when she first accesses interface 200. In some embodiments, the default suggestion is common across all users of platform 102. For example, a default setting could be to post three times per week, to post to all registered social media network accounts, and to post content of general applicability to many kinds of businesses/organizations (e.g., general news articles, general seasonal tips). In other embodiments, the default schedule is tailored (e.g., with different default schedules for each industry, including industry-specific content postings, as created by an administrator of platform 102 or other appropriate entity). As will be described in more detail below, examples of industry specific content include news articles specific to the automotive industry, summer driving tips, etc. If Alice makes changes to the suggested default, she can revert back to the suggested default schedule by selecting button 202.

Suppose Alice would like to create a schedule for Dent-Detroit from scratch, instead of using a default schedule. By choosing an option in region 204, Alice can indicate how frequently she would like content posted. In the example shown in FIG. 200, Alice has opted to set a daily schedule by selecting box 206. Having selected the "daily" option, Alice is presented with a list of each day of the week in region 208. Alice can refine precisely which days of the week she would like content posted by activating/deactivating particular days of the week by clicking on the day's name as it appears in region 208. In the example shown in FIG. 2, Alice has opted to have content posted on weekdays, but not on weekends.

For each day of the week that Alice has indicated content should be posted (e.g., Monday-Friday in FIG. 2) a set of two dropdown boxes (210, 212) is presented in interface 200. The first set of dropdown boxes (210) allows Alice to pick what type of content should be posted. As will be described in more detail below, which categories appear in the category dropdowns can be tailored to a particular industry. For example, if platform 102 maintains a taxonomy of 100 types of content (i.e., across all industries/interests), the categories shown to Alice when interacting with the dropdown can be limited to a subset of categories most likely pertinent to a dental practice. The second set of dropdown boxes (212) allows Alice to specify which social network(s) should receive the content. In various embodiments, a default setting of posting to all available networks is used, instead of allowing a user to specify which specific networks should receive content.

Using Monday (214) as an example, Alice has indicated that every Monday, content that is considered "fun" and oriented toward children (216) should be posted to each of Dent-Detroit's social networking accounts (218). Examples of such content include pictures of baby animals, knock-knock jokes, kid-oriented recipes (e.g., for easy-to-make afternoon snacks), etc. Using Tuesday (220) as another example, Alice has indicated that dental tips (222) should be posted to Dent-Detroit's Facebook account (224). Examples of such content include articles about proper brushing/flossing techniques, how to maintain good dental hygiene while camping, etc. Using Wednesday (226) as another example, Alice has indicated that any appropriate kind of content (228) should be posted (with the specific type of content selected by platform 102 each Wednesday), to any one of Dent-Detroit's social networking accounts (230). Alice can review which kinds of content platform 102 will select from if the "any" option is used by interacting with box 244. In particular, if Alice clicks on box 244, she will be shown a list of all available categories of content in platform 102. In various embodiments, certain categories are pre-selected by platform 102 based on the industry specified by Alice (e.g., at the time she created the account), with other categories of content not selected. For example, as a dentistry business, content pertaining to automotive news or landscaping advice is unlikely to be of interest to viewers of Dent-Detroit's social networking pages. Accordingly, while "landscape news" and "automotive tips" are example categories of content that platform 102 can provide to social networking sites on behalf of tenants, those types of content will not be included for consideration by platform 102 when selecting "any" content on behalf of Dent-Detroit (e.g., by default). In various embodiments, a business owner is able to alter the categories of content pre-selected by platform 102. For example, if Dent-Detroit caters only to adult patients, and Alice does not want to see any child-specific options (e.g., in region 216), Alice could deselect those types of content. As another example, if Dent-Detroit prides itself in being an environmentally-innovative company, Alice could select a category not typically associated with dentistry (e.g., "Eco News" or "Eco Tips") for inclusion in Dent-Detroit's set of categories. By adding "Eco News" or "Eco Tips" under the configured categories, those additional categories will appear in the dropdowns of region 210 and will also be considered for selection whenever platform 102 is instructed to pick "any" content (e.g., 228) on behalf of Dent-Detroit.

Using Thursday (232) as yet another example, Alice has indicated that general health news (234) should be posted to Dent-Detroit's Facebook account (236). Examples of such content include articles about a variety of new developments in health topics, such as dietary studies, exercise studies, etc. Finally, using Friday (238) as an example, Alice has indicated that more generalized fun (i.e., not child-specific fun) (240) should be posted to all of Dent-Detroit's social media accounts (242). Examples of such content include funny photographs, funny stories, jokes, etc.

Interface 200 is one example way that a tenant of platform 102, such as Dent-Detroit, can indicate what kinds of content should be posted to its social networking accounts, and when. Other approaches can also be used. For example, if Alice does not wish to choose specific days of the week that content should be posted, she can create a "weekly" schedule by clicking box 246. Alice will then be presented with the ability to specify the number of days per week (i.e., 1-7) that she would like content posted. For example, Alice could choose to have content posted "three times a week." And, instead of/in addition to providing specific instructions on which content should be posted for each of those three days (e.g., "kid fun" the first day, "health news" the second day, and "dental tips" the third day), Alice can instead specify a percentage mix of content (e.g., 50% fun, 25% health news, 12.5% eco news, 12.5% eco tips). Platform 102 will make selections of which types of content to post in accordance with the parameters specified by Alice. Finally, in various embodiments, Alice can set a custom schedule by selecting "custom" option 248. Alice can use this option to select specific recurring dates (e.g., February 14 of each year), or other date-related rules (e.g., every third Tuesday of the month).

When Alice is satisfied with the schedule she has selected in interface 200, she can select "save" button 250 to save her preferences. In some embodiments, Alice's preferences for Dent-Detroit's posting schedule are stored in a user database 504 along with the other information collected about Dent-Detroit. In other embodiments, Dent-Detroit's selected schedule is stored in a separate database. A given tenant's indicated preferences for what content should be posted where/when (e.g., as specified using embodiments of interface 200) are also referred to herein as the tenants "posting schedule."

Figure 11:
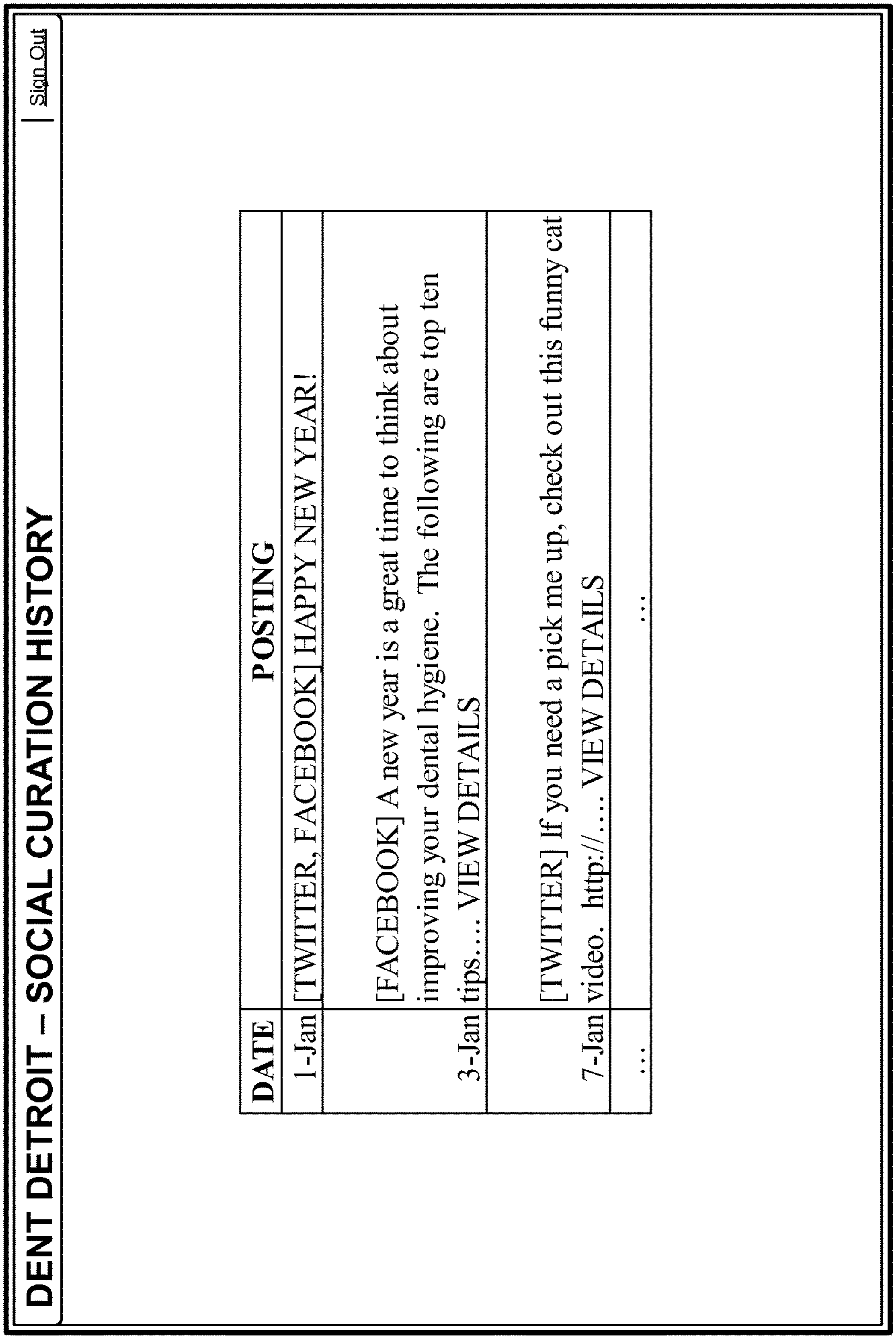
FIG. 11 illustrates an embodiment of a posting history interface as rendered in a browser.

Alice can continue to make postings on behalf of Dent-Detroit whenever she chooses (e.g., posting holiday party photos or welcoming new employees) as she has done in the past (e.g., using the interfaces provided to her by services 106-110). In various embodiments, platform 102 also makes available an interface that allows Alice to make such postings via platform 102. In addition, platform 102 will post content on behalf of Dent-Detroit (without requiring any action on the part of Alice) in accordance with the schedule specified by Alice. In some embodiments, rather than Alice interacting directly with interface 200, an account manager (e.g., representing the owner of platform 102) discusses Dent-Detroit's needs with Alice, and the account manager interacts with interface 200 on behalf of Alice. FIG. 11 illustrates an embodiment of a posting history interface as rendered in a browser. In particular, Alice can see which postings made by platform 102 on behalf of Dent-Detroit by interacting with interface 1100 (including information such as the date, social network, and content posted).

Figure 3:
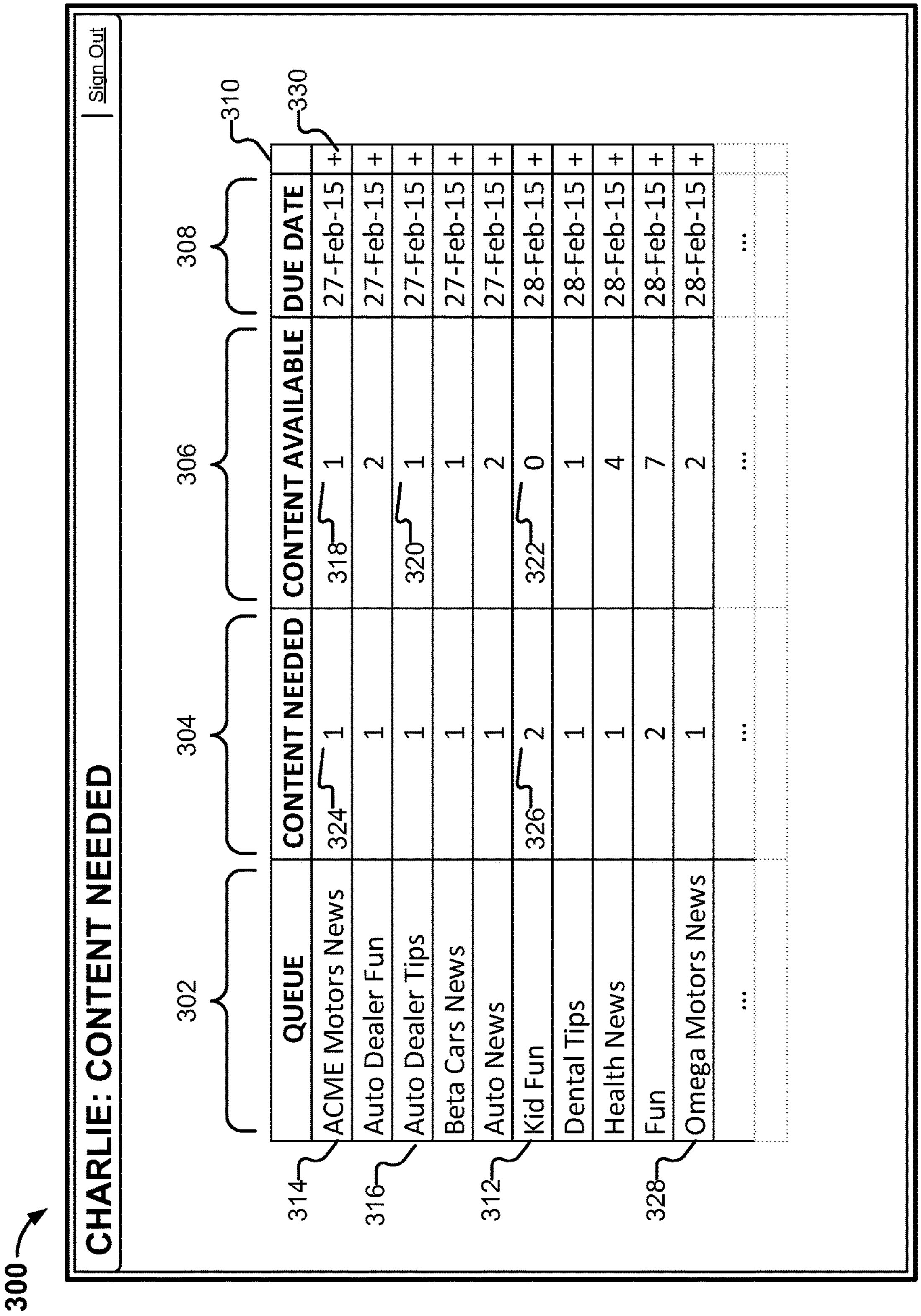
FIG. 3 illustrates an embodiment of a content status and submission interface as rendered in a browser.

FIG. 3 illustrates an embodiment of a content status and submission interface as rendered in a browser. In particular, Charlie is presented with interface 300 when he accesses platform 102 to determine what content platform 102 needs to fulfill the social networking posts it should make on behalf of its tenants. Charlie can use interface 300 to determine what particular types of content he needs to locate/generate and submit to platform 102.

Each row in column 302 corresponds to a type of content that a tenant of platform 102 can select. For example, the "Kid Fun" category chosen by Dent-Detroit for delivery on Mondays (216) appears at 312 in interface 300. Other examples of types of content (also referred to herein interchangeably as "queues") shown in FIG. 3 include "ACME Motors News" (news specifically about ACME Motors the company, ACME Motors car models, etc.) (314); "Auto Dealer Tips" (tips about summer driving, saving money on car insurance, etc., of applicability to all brands of car dealership) (316); and "Omega Motors News" (news specifically about a competitor of ACME and Beta—"Omega Motors") (328).

Column 306 indicates, for a given queue, how many pieces of content of that type are currently available for use by platform 102. So, for example, platform 102 currently has one piece of "ACME Motors News" content available (318), has one piece of "Auto Dealer Tips" content available (320), and zero pieces of "Kid Fun" content available (322).

Column 304 shows, for a given queue, how many additional pieces of that type of content are needed by the system to meet a given posting deadline (and to comply with any applicable content posting rules, described in more detail below). Additional content needed by the system (e.g., which Charlie needs to locate and supply to platform 102) to meet tenants' posting schedule is also referred to herein as "demand." The deadline is indicated in column 308. Using "ACME Motors News" as an example, one additional piece of content (324) is needed by February 27. As another example, two additional pieces of content (326) for the "Kid Fun" queue are needed by February 28. Techniques for determining how much content is needed, and by when, are described in more detail below.

After viewing interface 300, Charlie can either locate (e.g., through performing Internet searches), or generate appropriate content to provide to platform 102 in accordance with the indicated demand shown in column 304. Charlie can view a description of each queue by hovering his mouse over the queue name or otherwise interacting with interface 300 or one of its embodiments. For example, if Charlie is unsure of what differentiates "Kid Fun" from "Fun," he can review the description of each of those two queues accordingly. Suppose Charlie decides to begin providing content to platform 102 in the order it appears in interface 300. Specifically, he is going to locate the single piece of "ACME Motors News" needed (324) by February 27. Charlie looks through various automotive blogs and finds a positive review of a new ACME Motors vehicle. He can submit the content by clicking the "+" icon in the ACME Motors News row (330).

Figure 4:
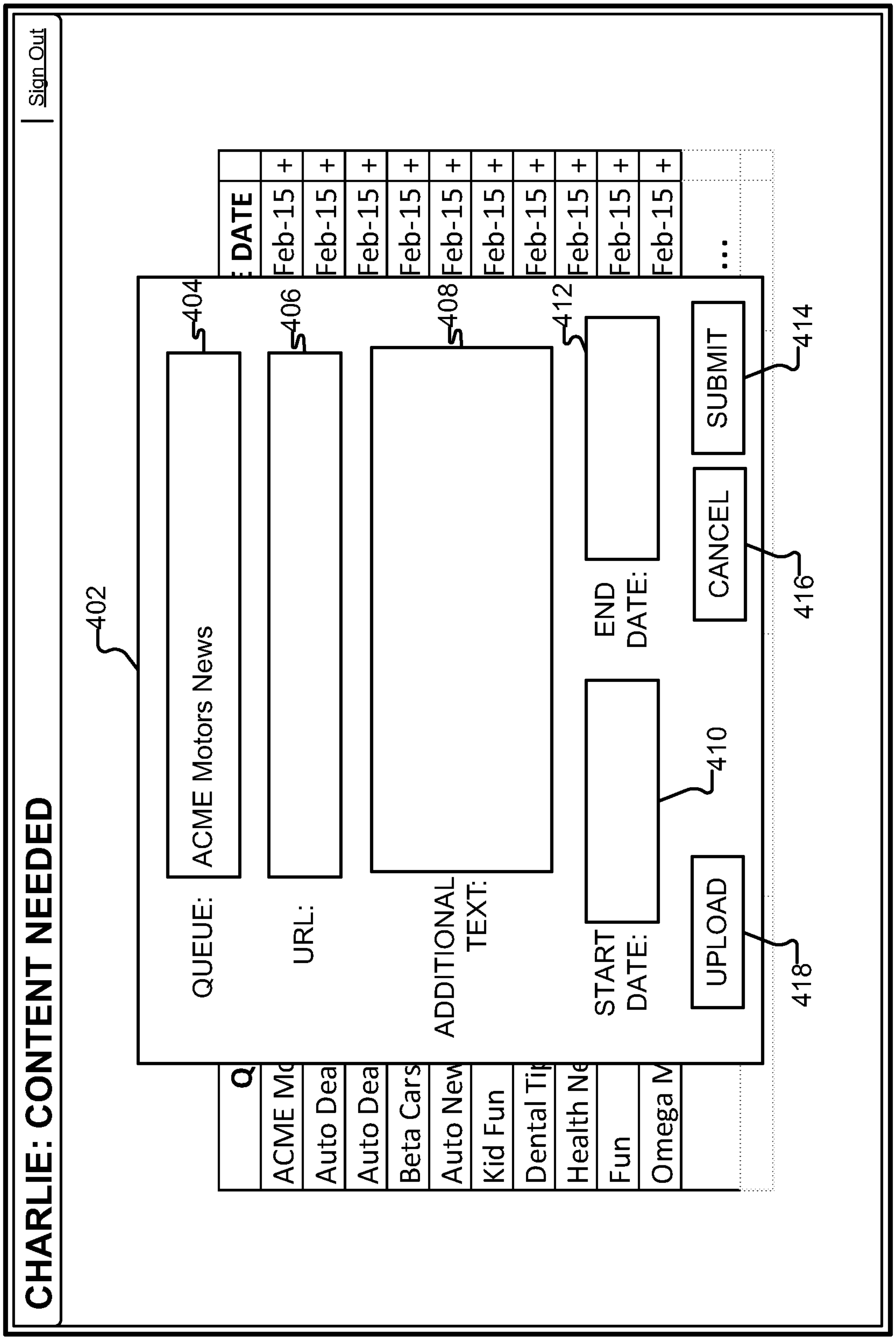
FIG. 4 illustrates an embodiment of a content status and submission interface as rendered in a browser.

When Charlie clicks on icon 330, a dialogue box 402 asking Charlie to provide information about his content will be displayed to him, as illustrated in FIG. 4. In the example shown in FIG. 4, region 404 is pre-populated with the queue name, "ACME Motors News," since Charlie clicked on the "+" icon in the ACME Motors News row. Bob can supply the URL of the review he located in region 406, and provide optional additional text (if desired/applicable) in region 408. An example of additional text is a short message that will appear at the top of the social networking posting, such as: "check out this review." Where Charlie is authoring the content himself, he may omit a URL in region 406. If the content is a picture or other type of media, Charlie can supply a URL to the media in box 406, and/or upload the content by selecting "Upload" button 418.

Charlie can supply an optional start date (also referred to herein as an "embargo date") in region 410. Charlie can supply an optional end date (also referred to herein as an "expiration date") in region 412. The start date represents a hard date before which platform 102 should not post the content. For example, if the content relates to "Memorial Day driving tips," Charlie might add a start date of around Memorial Day (preventing platform 102 from using the content February 27). As another example, suppose a movie will be released in three months that prominently features a particular model of car (and suppose that Charlie has located an article about the car). Charlie could set a start date for the article closer to the movie's release date. Charlie can also leave the start date blank, indicating that the content can be used immediately.

The end date represents a hard date after which platform 102 should not post the content. Again using "Memorial Day driving tips" as an example, Charlie could set an end date that aligns with the end of Memorial Day, so that the article will not continue to be posted after the holiday has passed. As another example, if Charlie's content is a press release, Charlie may choose to set an end date of two or three days after the date on the press release, so that the press release does not continue to be used too long (and look stale). As yet another example, if Charlie's content is a product review, a longer expiration date (e.g., of one or two months from the date Charlie submits the content) may be more appropriate, and Charlie can set that date accordingly. Charlie can also leave the end date blank, indicating that the content can continue to be used by platform 102, subject to any other applicable rules governing the posting of content by platform 102. So, for example, a particular funny picture of a cat can be posted on a Monday to Dent-Detroit's social networking accounts, and posted on a Tuesday to three different pediatricians' accounts (so long as those pediatricians are physically located a sufficient distance from one another, as described in more detail below), and posted weeks or even months later to another tenant's accounts.

When Charlie has completed filling out the appropriate information in dialogue box 402, he can submit the content to platform 102 by selecting submit button 414. He can also cancel the submission by clicking cancel button 416. In various embodiments, once Charlie selects "submit" button 414, a variety of quality checks is performed by platform 102. For example, platform 102 can perform a duplicate check to make sure that Charlie's submission is not already present within platform 102. As another example, a check can be performed (whether through the use of automated language analysis, or a human operator, or other appropriate techniques) to make sure that Charlie's content was properly classified. And, if applicable, an operator (or supervisor, or other entity as applicable) can perform other quality control checks on the content.

Suppose Charlie's submission of the ACME Motors car review successfully passes any applicable checks performed at platform 102. (And, that Charlie did not include an embargo date or expiration date for the article.) Charlie's successful submission of the content will reduce the "content needed" (also referred to herein as "demand") for "ACME Motors News" by one, and increase the "content available" by one, resulting in a value of zero in region 324 and a value of two in region 318.

Suppose, as with Dent-Detroit, ACME Motors of Detroit and Detroit Beta Cars have set up accounts with platform 102 and their respective office administrators (or other appropriate representatives) have set up schedules using interface 200. It may often be the case (particularly where platform 102 has thousands of tenants, or more) that multiple businesses have indicated that the same type of content should be posted to their respective social media accounts on the same day. For example, Dent-Detroit, ACME Motors of Detroit, and Detroit Beta Cars might all indicate that they would like "Fun" content posted on Friday (along with tenants located in other geographic regions).

One approach platform 102 could take is to provide identical content on behalf of every tenant sharing the same scheduled content request. So, for example, Dent-Detroit, ACME Motors of Detroit, and Detroit Beta Cars might all have the same funny cat picture posted to their respective social media accounts on Friday. While visitors to Dent-Detroit's Facebook page are unlikely to also visit ACME Motors of Detroit's Facebook page on Friday, one potential drawback of such an approach is that an individual, such as Bob, who is likely to visit the social networking pages of both ACME Motors of Detroit and of Detroit Beta Cars will see the same content posted to both accounts. While a single or occasional common post across both car businesses may not arouse Bob's suspicion, if identical content appears on both sites sufficiently frequently, Bob may form a negative opinion of one or both businesses. As will be described in more detail below, in various embodiments, platform 102 is configured to apply assorted rules when selecting content to post on behalf of a business. Platform 102 can take into account factors such as how many total times the content has been published (e.g., across any other businesses' social networking accounts), and can require that businesses in the same industry be located a minimum distance from one another in order to receive the same content (whether on the same day or within a certain period of content re-use time), etc.

Figure 5:
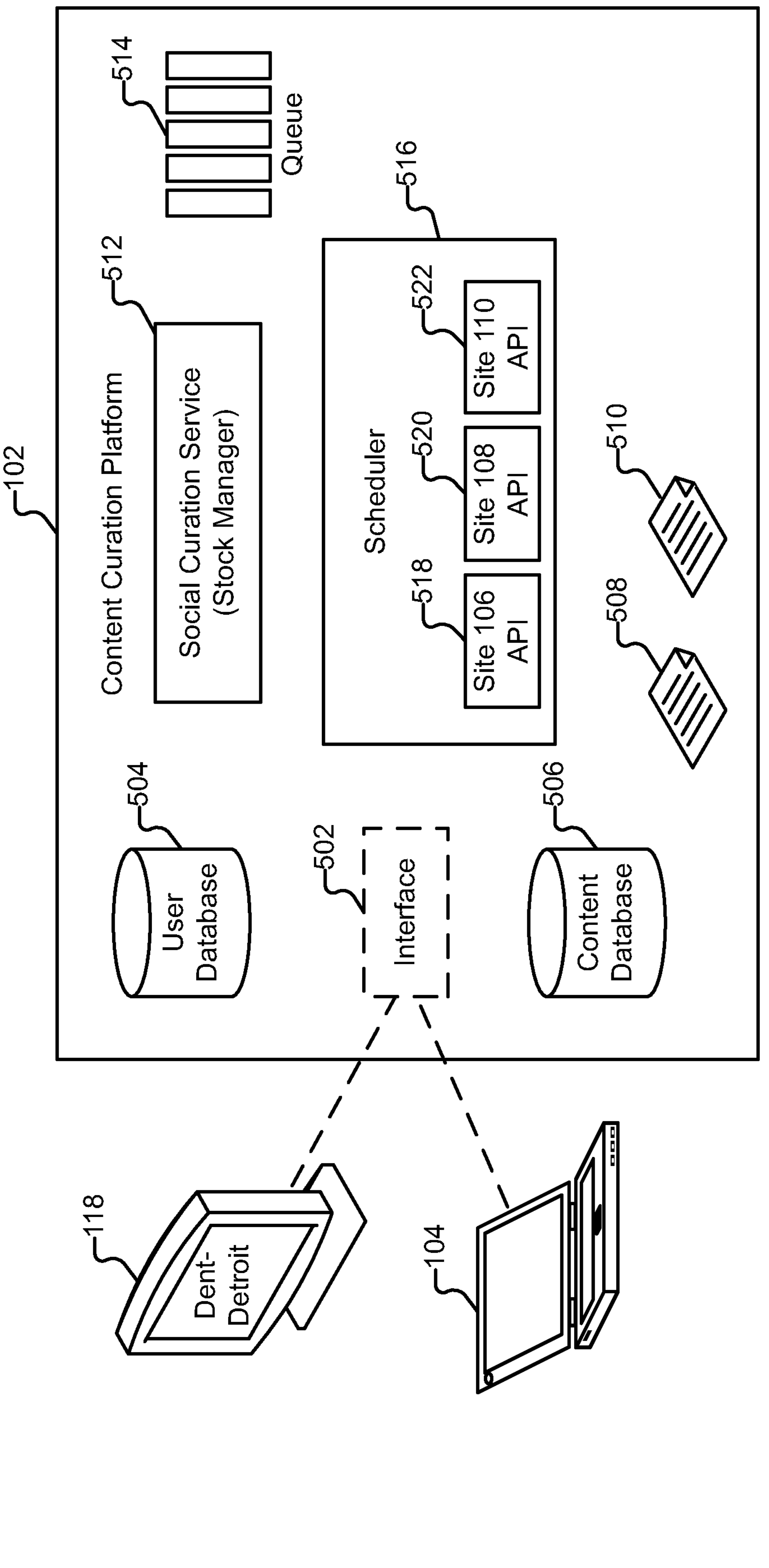
FIG. 5 illustrates an embodiment of a content curation platform.

FIG. 5 illustrates an embodiment of components included in a content curation platform. In particular, FIG. 5 illustrates components included in various embodiments of platform 102. Platform 102 is illustrated as a single logical device in FIG. 5, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, platform 102 is a scalable, elastic architecture comprising distributed components, including components provided by one or more third parties (e.g., provided by Amazon Web Services). Further, when platform 102 is referred to as performing a task, such as storing data or processing data, it is to be understood that a sub-component or multiple sub-components of platform 102 (whether individually or in cooperation with third party components) may cooperate to perform that task.

As mentioned previously, tenants of platform 102 (e.g., using client devices such as client device 118) and content collectors (such as Charlie, via laptop 104) can both communicate with content curation platform 102 using one or more interfaces. One example of an interface is web interface 502 (e.g., a set of one or more websites made available by one or more commodity servers running webserving software such as Apache).

In the example shown in FIG. 5, content curation platform 102 includes a user database 504 that stores user account information such as the profiles of platform 102's tenants and their content posting schedule preferences (e.g., as configured via interface 200). In some cases, a tenant account corresponds to a business with a single location (e.g., Dent-Detroit, which has a single office), or a small set of locations (e.g., a coffee shop business with four locations in Detroit). Typically, such tenants will have a single account (or other presence, as applicable) on each of services 106-110. Tenants can also be affiliated with much larger entities, such as enterprises/franchises, and those entities may be represented by many accounts on each of services 106-110. As one example, ACME Motors may have one hundred dealerships across the United States, with twenty additional dealerships in other countries. As with ACME Motors of Detroit, each of those dealerships may have its own set of accounts on each of services 106-110. Each individual dealership can similarly have an account with platform 102 (e.g., set up and maintained by the dealerships' respective office administrators). In various embodiments, platform 102 allows for the delegation of account setup/management. For example, a member of the ACME Motors marketing department can set up a single account on platform 102 that can be used to manage the posting of curated social networking content on behalf of multiple locations. The ACME Motors representative can also create company defaults, such as a default schedule of what kinds of content should be posted on which days. In various embodiments, hierarchical account access controls are made available by platform 102—e.g., with national/regional administrators of ACME Motors able to help manage accounts of individual dealerships on platform 102.

In various embodiments, database 504 also stores account information associated with content collectors (also referred to herein as "curators") such as Charlie (and other users, such as administrators of platform 102). Content curation platform 102 includes a content database 506 which stores the content provided to it by content collectors such as Charlie (e.g., provided via interface 300) and associated metadata. In various embodiments, additional metadata is stored for each piece of content (e.g., in addition to information provided by interface 300), such as the date it was included in the system, the number of times it has been posted, and on behalf of which tenants it has been posted. Databases 504 and 506 can be implemented in a variety of ways. As one example, while depicted in FIG. 5 as two separate databases, a single (or more than two) databases can be used to store/access various data used by platform 102. Further, a variety of database software can be used in conjunction with the techniques described herein. In the remainder of this description, references will be made to MongoDB software (e.g., running on a single server with appropriate sharding/replication), however other database software/infrastructure can also be used. Further, a variety of example tables that can be used by platform 102 are described in more detail below. The tables can be stored in either database 504 or 506, as applicable, and/or stored in other appropriate locations (such as a combined single database or third database not depicted).

Platform 102 also includes a set of queue definitions 508 that enumerate the different ways content can be classified (such as into "Health News," "Kid Fun," "Holidays," "Auto Racing Updates," etc.) and provide descriptions corresponding to each of the queues. As one example, the description of the "Kid Fun" queue can be: "Funny or interesting pictures, quizzes, jokes, or short posts appropriate for children aged 7-14." In various embodiments, content collectors, such as Charlie, are able to create/define new queues (e.g., based on a request made by a tenant) by interacting with an interface such as interface 600, shown in FIG. 6 (made available by platform 102). As one example, suppose that Omega Motors (an exclusively electric car company) chooses to start using the services of platform 102. At the time Omega Motors signs up with platform 102, a queue specific to electric vehicles has not yet been defined. Omega Motors can ask Charlie to create one, and specify that its content can include anything related to electric cars (e.g., news, tips, pictures, and/or reviews). Charlie can visit interface 600 and click on "Add Queue" button 602 to create the "Electric Car" queue and supply a corresponding description. The queue will then be added to queue definitions 508. Interface 600 also allows Charlie to view information about existing queues, including their names (604), descriptions (606), and the number of pieces of content for that queue currently available on platform 102 (608). Charlie can make edits to existing queue definitions (e.g., change the name of the queue, change the description of the queue, or delete the queue) by selecting the appropriate "Edit" button in column 610.

Returning to FIG. 5, platform 102 also includes a set of rules 510 that govern the selection of content for posting by platform 102 to social networking services 106-110. Some rules have global applicability, for example, a rule included in set of rules 510 can require that no content be posted after its expiration date (if defined) has passed. As another example, a rule included in set of rules 510 can require that no content be posted before its embargo date (if defined) has been reached. Rules can also vary based on the industry/classification associated with the tenant to whose accounts the posting of the content is being considered. As one example, a rule can require that a particular piece of content cannot be posted to accounts of tenants in the same industry, if the tenants are physically located within a configurable distance of one another. Tenants within the configurable distance (and within the same industry) are referred to herein as "neighbors," and a rule included in set of rules 510 can require that no "neighbors" post the same content on the same day (or post the same content within a threshold number of days, etc.). As one example, a fifty mile rule could be applied to the automotive industry, where shoppers will typically consider purchasing an automobile from any dealer within a fairly large area—meaning car dealers within 50 miles of one another are "neighbors." As another example, a ten mile rule could be used for tenants in the grocery industry—meaning grocery stores within ten miles of one another are "neighbors." And, a five mile rule could be used for tenants in the coffee shop trade—meaning coffee shops within five miles of one another are "neighbors." As explained above, in various embodiments, two different types of businesses (e.g., a car dealer and a coffee shop) can be allocated the same content, even if they are within a close distance of one another, as they are not "neighbors" by virtue of being in different industries. Rules can also vary based on the queue(s) with which the content has been tagged. For example, while a global rule of not reusing content more than 1000 times across all of platform 102's tenants can apply to most content (in most queues), certain queues can have different limits. For example, a general "Holiday" queue that wishes visitors a Happy Valentine's Day, or a Happy Saint Patrick's Day, etc., could have no limit set, or a much higher limit set (allowing all, or many tenants to post the same content).

In various embodiments, social curation service 512 is responsible for performing tasks such as selecting content on behalf of tenants, determining to which social networks the content should be posted (if applicable), and determining whether additional content is needed by platform 102 to meet tenant requests. One example way of implementing social curation service 512 (or portions thereof) is as software written in Java, executed as a nightly cron job (e.g., at 3 am). In the following example, suppose social curation service 512 runs nightly, and is configured to assess/facilitate social postings for two day periods. First, social curation service 512 (e.g., by examining tenant posting schedule records stored in user database 504) creates a list of tenant requests for content. The requests are stored, in some embodiments, using a stock request table, described in more detail below. As an example, if social curation service 512 is operating at 3 am on a Wednesday, the list includes all tenant requests for content applicable to Wednesday and to Thursday, and associated metadata (e.g., identifying the queue associated with the request). Note that how frequently the social curation service runs, and how many days' worth of analysis/posting should be performed are configurable (e.g., by an administrator of platform 102) and can be other values than those described in this example.

For each request included in the list of tenant requests, the social curation service (also referred to herein as the stock manager) checks a pool of stock (e.g., by examining a stock table stored in database 506) and determines whether the request can be satisfied (subject to rules 510). As one example, suppose, for a given queue, all tenants requesting an item from that queue, are located at least the minimum required distance away from one another (and/or are members of different industries) such that none of the tenants requesting an item from that queue for a given day are neighbors. A single piece of content can be used to satisfy all of those requests. As another example, one of the requests may be satisfied by reuse of content whose previous use by a neighbor precluded its reuse within a specified time period (which has now passed).

When social curation service 512 determines that a given piece of content should be posted on behalf of a given tenant (i.e., the request can be satisfied by stock in the pool), the social curation service provides instructions to scheduler 516. Scheduler 516 is responsible for posting content in accordance with the instructions, and makes use of a set of APIs (518-522) for communicating with each of the social networking services (106-110), using appropriate tenant credentials as needed (and, for example, retrieved from database 504). Example instructions indicate which content should be posted where, at what time, and on behalf of which tenant. In some embodiments, the posting task includes a specific time (e.g., 4 am Monday vs. 7 am Monday) or timezone (e.g., Monday, Pacific vs. Monday, Eastern)—based on a configurable factor such as the associated tenant's locale information. In other embodiments, the posting task includes only a day (e.g., Monday), with specific timing information omitted, or determined using a default, etc., as applicable (e.g., always post at 5 am in the tenant's local timezone). Scheduler 516 adds posting tasks to posting queue 514, and removes them from the queue as it becomes time to handle them (e.g., posting all of Wednesday's items on Wednesday, and then posting all of Thursday's items on Thursday).

Returning to the discussion of social curation service 512, in some cases, a given request (in the list of two-day tenant requests) cannot be satisfied by the existing content pool. In that case, social curation service 512 determines there is "demand" for content that can satisfy the request, and increases a demand counter associated with the queue for which there is demand (e.g., as stored in a demand table, an example of which is described in more detail below). Returning to FIG. 3, region 324 indicates a current demand of one item of ACME Motors News. This means that, without the addition to platform 102 of a piece of ACME Motors News, a tenant will not be able to have their request (e.g., for ACME Motors News on Wednesday) met. And, the presence of demand can be indicated to a content collector like Charlie to attempt to find content to satisfy the demand. Social curation service 512 can periodically re-evaluate demand so that, as Charlie adds new content to platform 102, tenants associated with previously unfulfilled requests can have those requests reevaluated and content associated with those tenants added to queue 514 as the contents of database 506 change.

Figure 7:
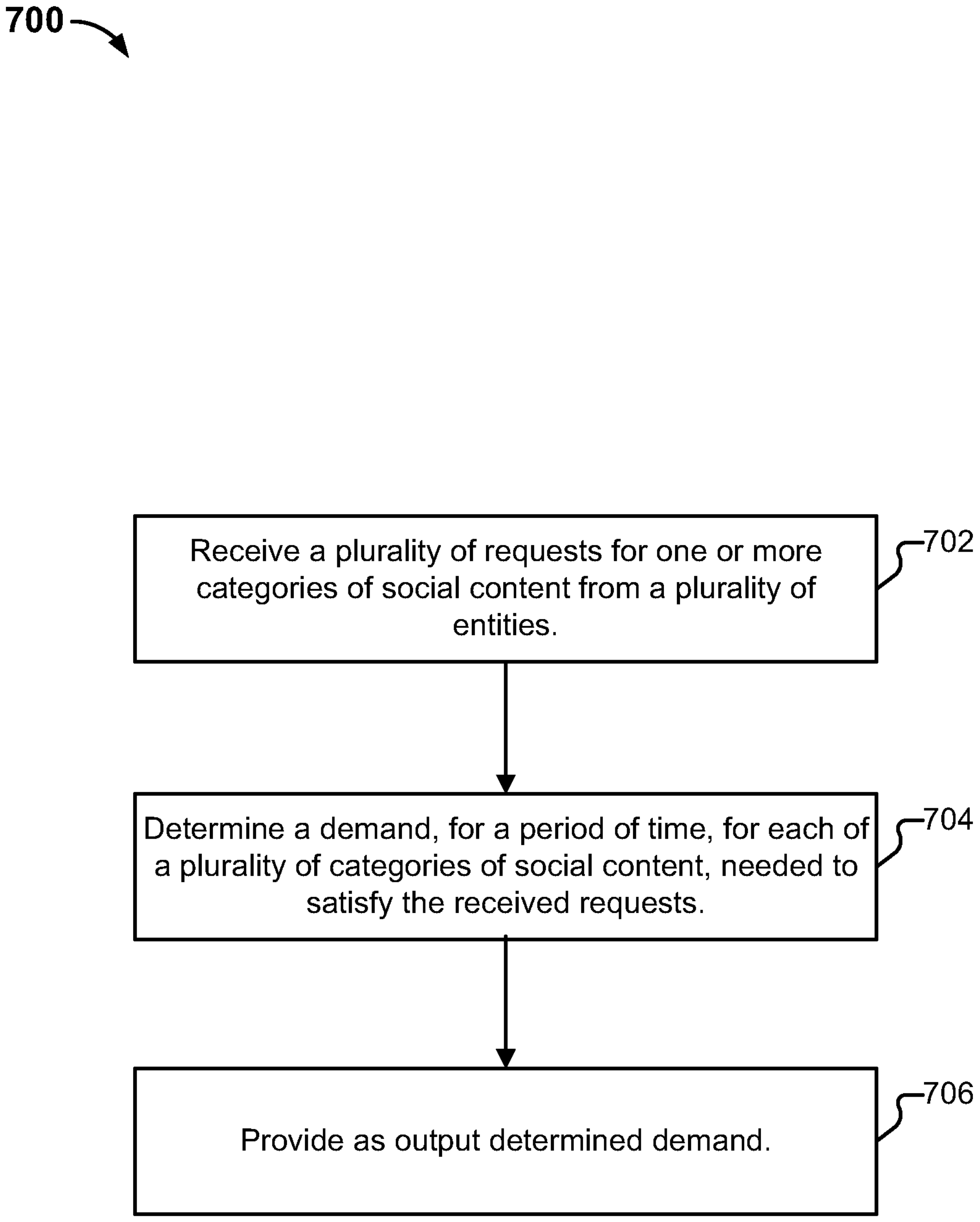
FIG. 7 illustrates an embodiment of a process for determining a demand for content.

FIG. 7 illustrates an embodiment of a process for determining a demand for content. In various embodiments, process 700 is performed by platform 102. The process begins at 702 when plurality of requests for one or more categories of social content is received from a plurality of entities. As one example, the requests can be received from various tenants of platform 102 via an interface such as interface 200. In some embodiments, process 700 is executed as a daily or other periodic batch process, and the requests are received at 702 by platform 102 examining requests (e.g., those previously received via interface 200) stored in database 504 or in another appropriate location. As explained above, examples of social content categories include "ACME Motor News," "Kid Fun," "Dental Tips," and any other social content categories stored in queue definitions 508.

At 704, a demand is determined. In particular, in various embodiments of process 700, a demand for content is determined for a period of time (e.g., the next two days or the next week), across each of the categories of content. As one example, at 704, a determination is made that a total of three additional pieces of "Kid Fun" are needed to satisfy the next two days' worth of requested content, as are five additional pieces of "Car News," etc. (in addition to content already present within platform 102). The determination made at 704 takes into account any applicable rules (e.g., set of rules 510). Techniques for determining demand are discussed in more detail below. Finally, at 706, the demand determined at 704 is provided as output. As one example, the output is displayed to Charlie at 706 in interface 300 (304). The demand can also be provided as output in other ways. For example, an instant message alert can be sent by platform 102 to Charlie indicating demand. As another example, an email message or other form of report can be sent to Charlie (e.g., including the information depicted in interface 300).

FIG. 8 illustrates an example of pseudocode for a process usable by embodiments of platform 102 to post social content and calculate demand for a given time period, for a group of tenants within an industry. In particular, the process is triggered at a time "C" (e.g., as part of a daily cron job that runs at 3 am) and calculates a demand Dn days into the future. For each tenant, if stock is available, the stock will be published on behalf of the tenant. If stock is not available, an exception is created in the consumer inventory table.

Example Data Models

A tenant requirement is the mapping between a day and a category requirement for a given tenant. For example, in the following data model example, a tenant has a requirement for tagID "535dbcb9454e3d15b0ab8faa" (ACME Motors News) on day "2" (Monday) [Sun=1, Mon=2, . . . , Sat=7]. A tenant may have zero requirements for a given day. For example, the following consumer has no requirement set for days "1" or "6":

```
"dayAndRequirement": {
    "2": ["535dbcb9454e3d15b0ab8faa"]
    "3": ["535dbcb9454e3d15b0ab8fab"],
    "4": ["535dbcb9454e3d15b0ab8fac"],
    "5": ["535dbcb9454e3d15b0ab8fab"],
    "7": ["53d7e6cde4b08b2bdf0e5fe9"]
}
```

An example data model for a tag (which corresponds to a queue) is as follows, with "_id" being a unique identifier for the tag, "description" being the human readable description, and "name" being the human readable name for the tag:

```
{
    "_id" : "535dbcb9454e3d15b0ab8faa",
    "description" : "Contains blog posts, press releases, and articles from
ACME Motors, including photos, videos, and rich-media published by
ACME Motors.",
    "name" : "ACME Motors News"
}
```

An example data model for a consumer inventory table that can be used to keep track of locations and requirements is as follows. An example query is one that searches for all locations that do not have their demand satisfied for a particular day:

```
{
  "tenantId" : 2443,
  "locationId" : "2443_1",
  "exceptionType" : "STOCK_NOT_FOUND",
  "publishOn" : "2014-07-24T07:00:00Z",
  "tagId" : "5399eb389be025ac01cef31c"
}
```

As mentioned above, "stock" is used herein to refer to a particular piece of content for social posting. Also as mentioned above, a piece of stock has associated release/expiration dates. Further, a given piece of stock can have one, or multiple tags associated with it, where a tag corresponds to a queue. For example, a funny picture of a cat could be tagged for use with both the "Kid Fun" and the more general "Fun" queues. An example data model for a stock table, which keeps track of current inventory of stock is as follows (in this case, an entry for a piece of stock which is a video about how to use an ACME feature):

```
{
  "_id" : "53da6119e4b08b2bdf0e6456", //unique stock identifier
  "description" : "ACME MMI: Voice Recognition -- Calling Contacts",
  "expiresDate" : "2016-01-01T08:00:00Z",
  "releaseDate" : "2015-08-01T07:00:00Z",
  "text" : "Connect with others easily using the voice recognition feature in your #ACME Multi Media Interface (MMI).",
  "tagIds" : ["53d7e6cde4b08b2bdf0e5fe9"], // identifies the tag (queue)
  "url" : "https://www.youtube.com/watch?v=Y3wseY6kBrIQ"
}
```

The stock request table keeps track of tenant requests for content. An example data model for a stock request is as follows:

```
{
  "tenantId" : 2443, //the unique identifier of the tenant
  "locationId" : "2443_1", //which location, of multi-location business, this is, if applicable
  "groupId" : "53d1864ce4b0e5caf9f00a13", //groupId reflects the fact location has been bucketed and hence when stock is available for this particular group of locations demand will be satisfied
  "publishOn" : "2015-07-24T07:00:00Z", //when the content should be published
  "tagId" : "5399eb389be025ac0lcef31c" //the identifier of the queue
}
```

A group is a collection of content consumers that share a content requirement (subject to conditions). Examples of conditions are: (1) the members are not neighbors; and (2) the members all have requested content of the same type. A given group's request is fulfilled (or fulfilable) by an associated particular piece of content, meaning that each member of the group has posted that content (or, e.g., is about to/able to post that content). So, for example, a group, having a unique group identifier, has associated with it all the identifiers of tenants who posted a particular content item, as well as metadata associated with the content (such as any embargo/expiration dates, total usage count, etc.). New tenants can be added to a given group so long as the new tenant isn't a neighbor of the other group members, subject to any additional constraints on the usage of the content (e.g., an expiration date hasn't passed and/or a total usage count hasn't been exceeded). Or, in some embodiments, if the new tenant is a neighbor of a group member, that group member has not itself been added to the group (i.e., posted the content) within a given time frame The demand table holds the current state of "demand" for content. It can be used to depict, to a content collector, what kinds of content are needed to satisfy upcoming tenant content requests (e.g., as shown in interface 300). An example data model is as follows:

```
{
  "publishOn" : "2014-07-24T07:00:00Z", //the date used to calculate demandValue (e.g., if publishing occurs on publishOn date, demandValue number of items are needed by the system)
  "demandValue" : "5", //for the publishOn date, this is the current demand
  "tagId" : "5399eb389be025ac01cef31c"
}
```

FIG. 9 illustrates an example of pseudocode for stock manager logic. In particular, FIG. 9 shows an example of logic that can be used by social curation service 512 to determine whether sufficient stock exists to satisfy a request. If the requested stock is present in the stock table, the stock is returned in response (and appropriate instructions can be provided to scheduler 516). If the requested stock is not present, demand is raised (e.g., in the demand table) indicating that a content collector should locate and provide that content to platform 102.

FIG. 10 illustrates an example of pseudocode for a process usable by embodiments of platform 102 to determine group membership. An aspect of determining group membership is to determine if demand needs to be raised. To determine if a certain location should raise demand, one aspect is to determine if the group into which the location has been bucketed already has a location that raised demand. If not (i.e., the location does not belong to any group) then the group creation logic is called via raiseDemand. First, all neighboring locations are found, and used to see if there are any groups that can be joined. If so, then the location is associated with the given group. Else a new group is created and demand raised.

In the following discussion, suppose that social curation service 512 has just started performing its batch analysis of tenant requests (e.g., at 3 am on Wednesday). Further suppose that the first request examined is by ACME Motors of Detroit for "Auto News" on Wednesday. The social curation service will evaluate each request in sequence. Initially, a tenant is not associated with a group. Accordingly, for the first tenant, ACME Motors of Detroit, the social curation service performs a query asking for all neighbors of ACME Motors of Detroit. One way to perform such a query is to use MongoDB's geospatial index. With this approach, the query includes an identifier of ACME Motors of Detroit, and the results will be the identifiers of other tenants within the queried distance (e.g., based on the location information provided by the tenant at enrollment time and stored in database 504). The query can be narrowed to return just results from tenants sharing the same industry as ACME Motors of Detroit. And, as mentioned above, different distances can be used for different industries, as applicable. Any returned results are neighbors of ACME Motors of Detroit (i.e., car dealers within 50 miles of ACME Motors of Detroit).

If ACME Motors of Detroit requests an "Auto News" content item for Wednesday, any existing group (which corresponds to Auto News content) that does not include as a member any of ACME Motors of Detroit's neighbors is a group to which ACME Motors of Detroit can be assigned, so long as a content item associated with the group isn't embargoed, isn't expired, etc. (conditions which can be provided as query parameters). Social curation service 512 can use any returned neighbors in an exclusionary manner to get a list of groups to which ACME Motors of Detroit could be assigned—meaning that a group will be selected for ACME Motors of Detroit, so long as that existing group does not contain any of the returned neighbors. (Or, in embodiments where reuse is permitted—so long as any neighbors in the group were added to the group sufficiently long ago.) Where multiple groups are returned, social curation service 512 can select a group for ACME Motors of Detroit at random to prevent any arbitrary group from growing excessively large due to its position in results. The group's stock (if one has been assigned) can then be used by ACME Motors of Detroit to post on Wednesday. In some cases, the group to which a tenant is assigned may not have stock. This can occur if there is already demand present for a given content item. Eventually, if Charlie puts a new piece of content into platform 102 that satisfies the group's request, the content can be associated with the group and all group members will be able to post that content, accordingly.

If no group exists to which ACME Motors of Detroit can be assigned, a group is created, with ACME Motors of Detroit as its initial member. If there is stock (of the "Auto News" variety) present in platform 102 that is not currently associated with a group, that stock can be assigned to ACME Motors of Detroit's new group. If there are no Auto News items unassigned to groups, this indicates demand for Auto News, and the count for Auto News in the demand table can be raised accordingly. And, as explained above, additional tenants who request Auto News (and are not neighbors of ACME Motors of Detroit) can be added to the newly created group without raising demand (as, once a single content item is added to platform 102, and associated with the group, it will satisfy all the group members).

Local Content Publishing

As described above, content curation platform 102 can automatically post relevant content to various services on behalf of its subscribers or tenants, where content in various categories or queues (e.g., "Health News," "Kid Fun," "Holidays," "Auto Racing Updates," etc.) can be requested and scheduled.

As will be described in further detail below, content curation platform 102 can also be configured, on behalf of its subscribers, to facilitate publishing of content that is locally or geographically relevant to tenants' locations (also referred to herein interchangeably as "rooftops"). The publishing of locally relevant content can be facilitated by virtual queues based on DMAs (Designated Market Areas) assigned to locations.

Figure 12:
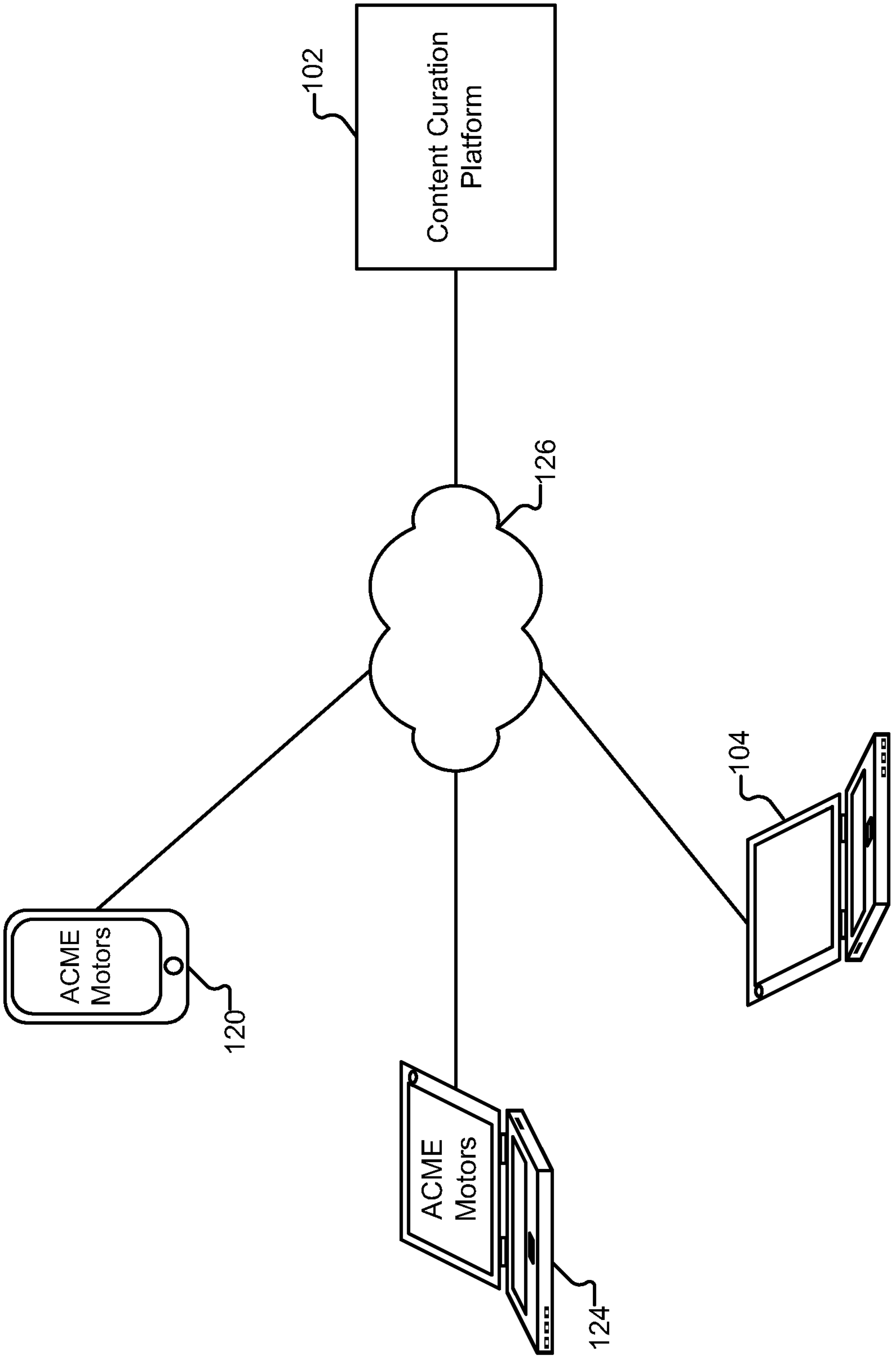
FIG. 12 illustrates an embodiment of an environment in which location publishing is performed.

FIG. 12 illustrates an embodiment of an environment in which location publishing is performed. In this example, suppose that both ACME Motors Detroit and ACME Motors Cleveland have subscribed to the local content publishing services provided by platform 102. Suppose that in addition to the "ACME Motors News" queue described above, ACME Motors asks Charlie to create a queue (also referred to herein as a "tag") for ACME Motors news content that is targeted or otherwise relevant to the Midwestern United States. Content in the queue should be published to all of ACME locations in the Midwestern United States, including Detroit and ACME Motors Cleveland, but nowhere else.

Figure 6:
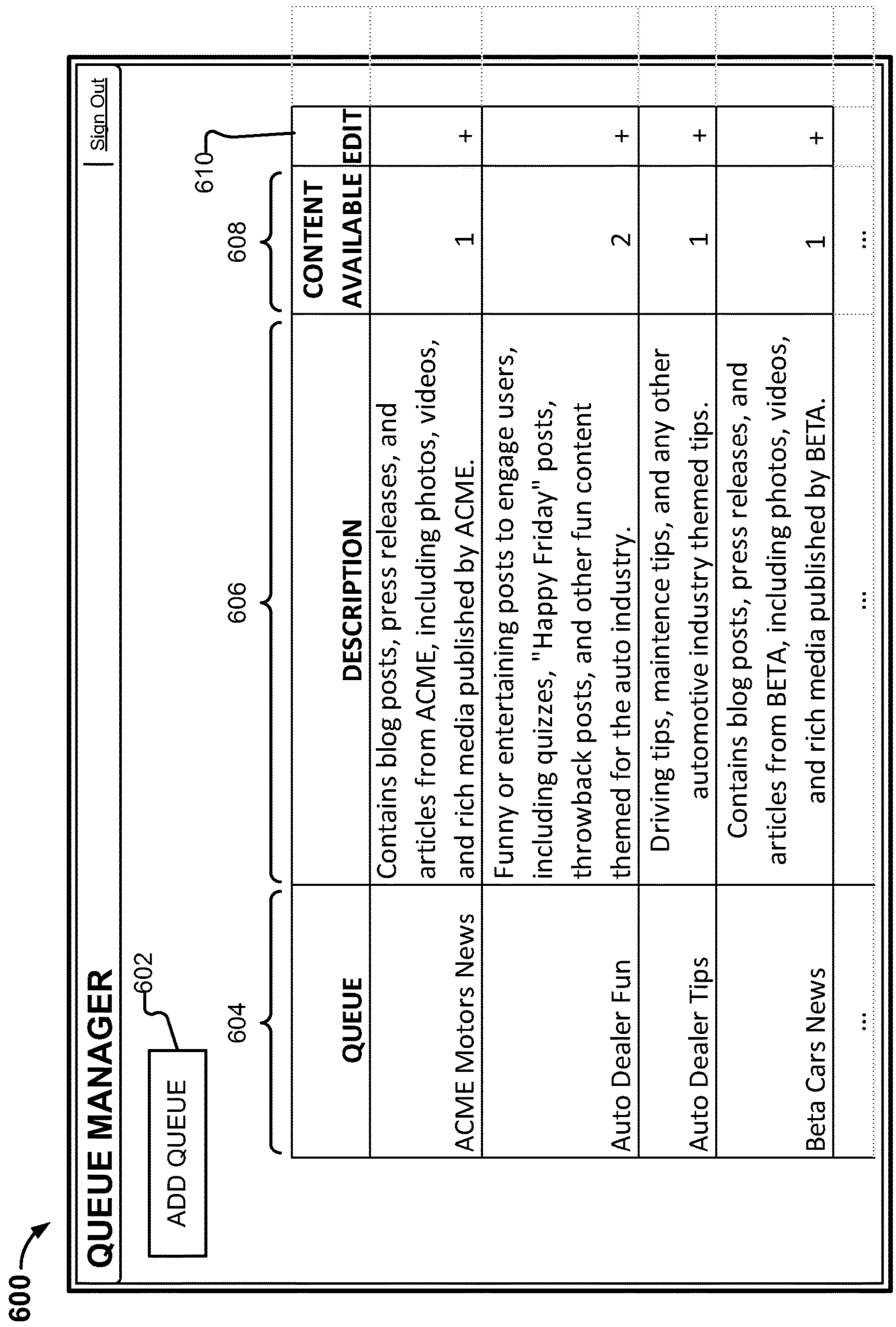
FIG. 6 illustrates an embodiment of an interface as rendered in a browser.

To define the new queue, Charlie interacts with an interface such as interface 600, shown in FIG. 6 (made available by platform 102), and clicks on "Add Queue" button 602 to create the "ACME Motor News—Midwestern" queue. Charlie supplies various information about the new queue, such as a name and a corresponding description of the new queue, as described above. Charlie can also specify a tenant ID (e.g., an identifier for ACME Motors), indicating that only ACME Motors locations should receive content in the new queue. In addition, Charlie also assigns a geographical region to the new queue.

In this example, suppose that Charlie will be assigning regions of the United States to the queue that he is defining (regions of other geographical entities at various levels of granularity, such as cities, counties, provinces, states, countries, continents, planets, etc. can also be assigned). For illustrative purposes, suppose that the United States has been divided according to designated market areas (DMAs), each covering different portions of the US (other types of divisions can also be used). Each DMA may include a different set of zip codes.

Charlie is presented with a user interface by which he can select one or more DMAs to assign to the queue that he is defining (in other embodiments, each DMA is associated with a corresponding queue). As one example, Charlie can be provided with a dropdown menu list including all available DMAs. As another example, a map of the United States can be presented, graphically displaying the various DMA regions (selectable) covering the US. In this example, Charlie selects the Midwestern region to assign to the queue.

In the above example, Charlie specifically selected the Midwestern DMA/region to assign to the "ACME Motors News—Midwestern" queue. Charlie can also select regions to assign to or associate with a queue in other ways. As one example, suppose that the U.S. Women's soccer team has just won gold at the Olympics. Charlie would like content associated with the team to be broadcast to all U.S. locations of tenants that have subscribed to local content publishing. As one example, when Charlie interacts with an interface to select the regions, the interface includes a "select all" button.

As another example, Charlie can also selectively exclude regions from being assigned to a queue. For example, suppose that the Cleveland Horseman have lost the National Basketball Championship to the San Francisco Spartans. Content about the Spartan's win should be shown everywhere in the country, except for in Cleveland. Charlie can define such a queue, for example, by first selecting all regions, as described above, to assign to the queue. Charlie can then selectively exclude/remove (or unselect) the Cleveland DMA. As another example, Charlie is provided an option to select specific regions to exclude from receiving content. Charlie elects to exclude the Cleveland DMA. Platform 102 then automatically selects all other available DMAs to assign to the queue. Thus, the queue that Charlie has defined will be used to publish content added to it throughout the U.S., except for the Cleveland area.

In some embodiments, a queue is assigned multiple DMAs. In other embodiments, each DMA is assigned or associated with a corresponding queue (e.g., SF DMA is assigned an SF queue, an LA DMA is assigned an LA queue, an NY DMA is assigned an NY queue, etc.). In some embodiments, when Charlie selects the DMAs for which a piece of content is to be published, the content is added to all of the queues corresponding to the selected DMAs. Thus, a queue may have a one-to-one or one-to-many relationship with DMAs.

Once a queue has been defined, platform 102 is configured to determine on behalf of which of the tenant locations or rooftops for which it maintains information about (and that have subscribed to local content publishing) content in the queue should be published. One example of determining the appropriate locations or rooftops is as follows.

Taking the "ACME Motors News—Midwestern" queue as an example, platform 102 first determines what zip codes fall into the DMA(s) assigned to the queue. As one example, platform 102 uses a mapping between DMAs and zip codes to determine the zip codes that are covered under the Midwestern DMA. In some embodiments, a DMA is a collection or list of zip codes. In the above example, queues are assigned DMAs, where a DMA includes one or more zip codes. The queues are then associated with a set of zip codes via the associated DMAs. As will be described in further detail below, in some embodiments, the zip codes are then used to determine the locations or rooftops on behalf of which content assigned to the queue should be published. Representations of groupings of zip codes other than DMAs can also be used. In some embodiments, zip codes can be directly added to or defined for a queue or tag.

In some embodiments, for each of the determined zip codes, platform 102 also determines the time zones corresponding to each of the determined zip codes (e.g., cst, mountain, pst, pdt, etc.). This allows, for example, for the content to be published at the same local time at each of the locations or rooftops covered by the DMA.

With the zip codes corresponding to the Midwestern DMA identified, platform 102 then determines which subscriber locations are located in the determined zip codes. For example, platform 102 maintains various information about the tenant locations that are subscribers to the local content publishing service, such as name and phone number. Platform 102 also maintains physical address information associated with the subscriber locations. Platform 102 is configured to search the maintained or stored locations for those locations that have zip codes matching to the determined zip codes in the Midwestern DMA. Thus, platform 102 can determine that locations such as ACME Motors Detroit and ACME Motors Cleveland (i.e., tenant/subscriber locations/rooftops) have zip codes that are under the Midwestern DMA and should be associated with the "ACME Motors News—Midwestern" queue (i.e., content in the queue should be posted to various services on behalf of locations such as ACME Motors Detroit and ACME Motors Cleveland identified as being the Midwestern DMA). An example of a data model of a queue including assigned zip codes is described below.

Suppose, in this example, that platform 102 determines that there are 21 ACME Motors rooftops that are covered by the Midwestern region/DMA assigned to the new queue. Now suppose that there is demand for content in the queue. Charlie then finds or creates content for the queue to satisfy the demand. As one example, suppose that there is a flower show happening in Toledo, for which ACME Motors is an event sponsor. Charlie adds a piece of content to the queue. The content is applicable to all of the ACME Motors locations in the Midwestern DMA, regardless of how close to each other they are.

In this example, suppose that the content has a life of seven days (e.g., determined by subtracting the expiration date from the start date). Platform 102 is configured to schedule (using a scheduler such as scheduler 1304 of FIG. 13, described in further detail below) the publishing of the content on behalf of the 21 locations assigned to the queue. As one example, platform 102 is configured to evenly spread out the publishing of the content to the locations across the life of the content. Platform 102 does this, for example, by taking the number of locations and dividing it by the life of the queue. This calculation determines the number of locations assigned to the queue that will receive the content for each day of the life of the queue.

In this example, as there are 21 locations, and the life of the content is seven days, three locations will receive the content each day, from the start date of the content (e.g., release date, before which the content cannot be used) to its expiration date (e.g., date after which the content or stock cannot be reused). Platform 102 is then configured to schedule, for each of the seven days, of the life of the content, which three of the 21 locations are to receive the content.

In this example, for the starting (first) publishing date of the content, platform 102 randomly selects three locations from the 21 locations on behalf of which to publish the content. Those three locations are then removed from consideration (as their demand will be satisfied on the first publishing date). For the second day of the life of the content, platform 102 again randomly selects three locations on behalf of which to publish the content. The three locations are selected from the 18 remaining locations assigned to the queue. Platform 102 continues to schedule three locations per day for the remainder of the life of the content. By spreading out the publishing of content over the life of the content, the 21 locations are prevented from having the same content being published at the same time.

In this example, suppose also that the content about the flower show is to be published at 3 pm local time for the various locations assigned to the queue (that fall into the zip codes assigned to the queue). As described above, in some embodiments, platform 102 determines, based on the zip codes assigned to the queue, the corresponding time zones to which the zip codes fall under. When the content is published for a location, it is published based on the determined time zone for the location. Thus, even if locations are in zip codes that are in different time zones, content will be published on their behalf at 3 pm local time. In some embodiments, the time zone specific publishing is enabled by default. In some embodiments, a default publishing time is used. In other embodiments, the publishing time can be specified or configured for a piece of content. Other examples of publishing scheduling will be described below.

Platform 102 then publishes the flower show content on behalf of the 21 locations according to the scheduling described above (where the content is published for three locations for each day of the week-long life of the content). The requirement or demand for the content can then be decremented, as it has been fulfilled.

Evergreen Content

In the example environment of FIG. 12, the flower show content was for an upcoming event, and had a finite life. Once the content has been published and has expired, it is no longer used again. In some embodiments, reusable pieces of content (e.g., to be used on a recurring or periodic basis) can be configured and published. As one example, Charlie can add content that is to be reused each winter season, reminding viewers of the content to check their cars to get ready for the snow season. Charlie can configure the content to be reused each year, as well as make it applicable to only relevant regions, such as the Northern and Northeast United States.

For example, when Charlie creates or obtains the snow advisory content, he can select, via an interface, an option that allows him to mark the content as reusable (also referred to herein as "evergreen" content). In one embodiment, when Charlie specifies the start date and end date for the content, he leaves the year portion of the dates blank, indicating to platform 102 that the evergreen content is to be repeated and reused periodically (e.g., every year around the same date).

Charlie can then ensure that the content is shown only to the relevant regions by adding the snow advisory content to queue(s) that are assigned applicable regions such as the Northern and Northeastern United States (e.g., by selecting appropriate DMAs to assign to the queue(s) in which the snow advisory content is to be placed).

Based on the specification of the content as evergreen, every year, around the start and end date (e.g., starting month/day and ending month/day), platform 102 will publish the snow advisory content to the locations in the regions assigned to the selected queues to which the content was added (e.g., using the evenly or linearly spread distribution described above). Each year, around the same time, the same content will be repurposed and republished by platform 102 on behalf of the locations in the regions assigned to the queues. Thus, the content to be reused need only be configured and added to queues once, and the content will be republished automatically on behalf of the locations in the relevant regions.

Instant Publishing

In the example of FIG. 12, the publishing of the flower show content was evenly distributed across the locations across the life of the content, where different locations received the content on different days throughout the life of the content. In some embodiments, platform 102 can also support the publishing of content that is to be instantly published. For example, once the US Women's National Team wins the gold medal for soccer at the Olympics, content congratulating the win should be broadcast nationally to all tenants or subscribers across the United States simultaneously and immediately. In some embodiments, when specifying content, Charlie can select, via an interface, an "instapublish" option, indicating that this content should be published instantly and at the same time for everybody (e.g., all locations or rooftops that are subscribers of the local content publishing service). When Charlie adds the content to a queue for publishing (e.g., a queue that has assigned to it all DMAs across the United States), platform 102 will recognize, based on the selection of the "instapublish" option, that the content should be immediately published. In some embodiments, when Charlie selects the option to "instapublish," he will be provided with an option to select the DMAs that should receive the content to be instantly published. Platform 102 can, by default, select all of the available DMAs. A queue can then be dynamically generated for the content to be instantly published.

Platform 102 will then publish the content to all locations in the United States (e.g., based on zip code allocation, as described above) immediately. Any time zone calculations can be overridden so that the content will be published at the same time on behalf of all locations, regardless of differences in time zones. In some embodiments, content can be scheduled in advance to be instantly published to all locations associated with a queue (where the locations are determined, for example, as described above).

Figure 13:
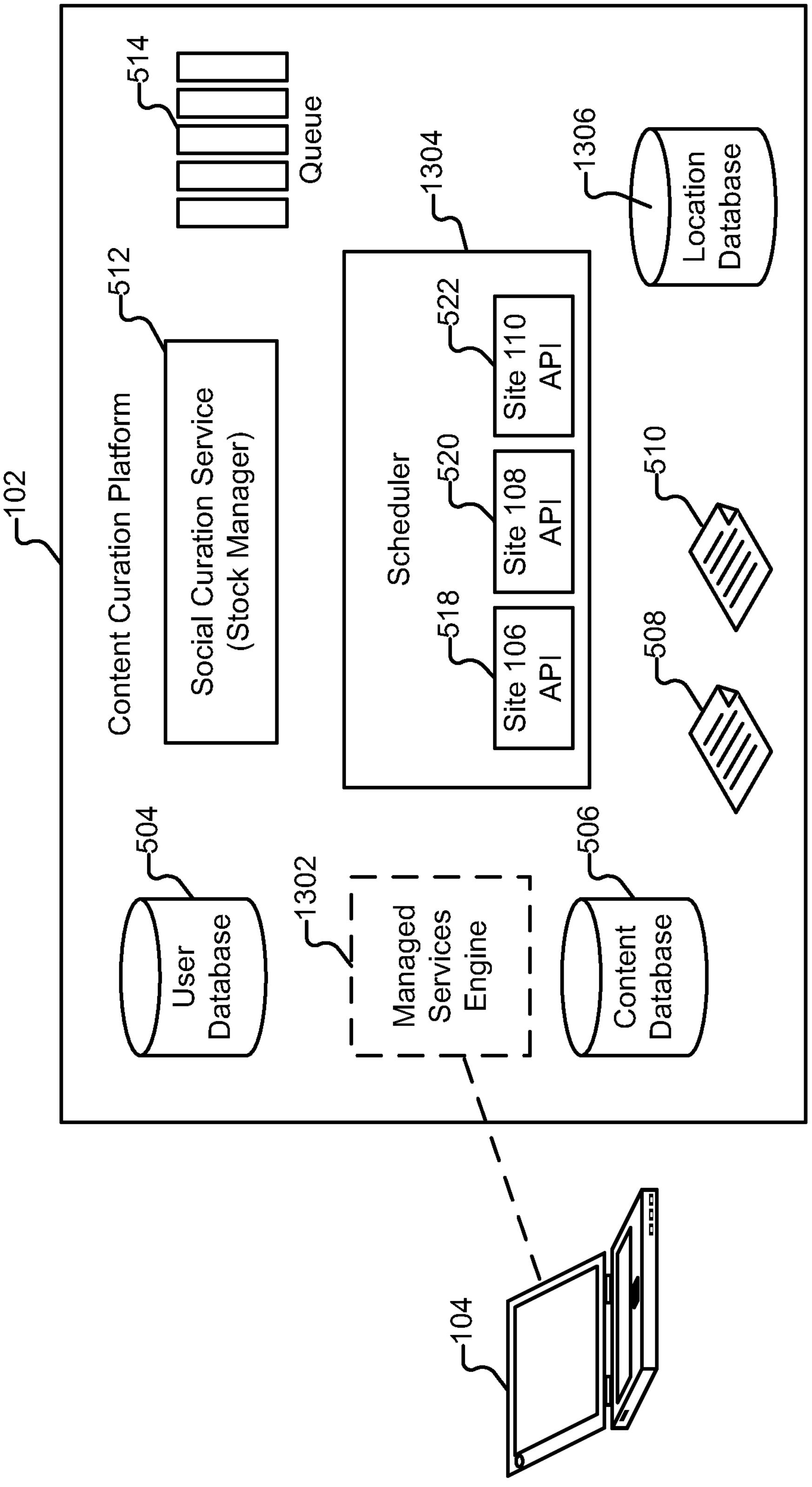
FIG. 13 illustrates an embodiment of components included in a content curation platform.

FIG. 13 illustrates an embodiment of components included in a content curation platform. In particular, FIG. 13 illustrates components included in various embodiments of platform 102, such as for facilitating local content publishing. Platform 102 is illustrated as a single logical device in FIG. 13, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, platform 102 is a scalable, elastic architecture comprising distributed components, including components provided by one or more third parties (e.g., provided by Amazon Web Services). Further, when platform 102 is referred to as performing a task, such as storing data or processing data, it is to be understood that a sub-component or multiple sub-components of platform 102 (whether individually or in cooperation with third party components) may cooperate to perform that task. In some embodiments, platform 102 as illustrated in FIG. 13 is implemented using JAVA (or any other appropriate programming language), with application programming interface (API) integrations (e.g., 518-522) to sites such as sites 106-110.

In this example, platform 102 includes managed services engine 1302. In some embodiments, managed services engine 1302 provides an interface (e.g., web dashboard) to a user such as Charlie (104). In some embodiments, managed services engine 1302 is used to provide an interfaces such as interface 502 of FIG. 5. In some embodiments, the presented dashboard includes a tab for local content publishing. When selecting the tab, Charlie is presented an interface by which he can view and configure queues, see the demand for queues, as well as add content to queues. As described above, configuring (or defining) a queue includes selecting one or more geographical regions to assign to the queue. In some embodiments, the queue is a tag that refers to a certain geographical area. The geographical area may contain DMAs and several sub-regions, such as zip codes. The queues can be included in queues 514.

As one example, geographical regions such as DMAs can be selectively included and/or excluded from being assigned to a queue. In some embodiments, content (stock) is obtained from content database 506, and added to a queue by assigning it a tag identifying the queue. This indicates that stock should be published in the locations that are included in the areas specified by or assigned to these tags. In some embodiments, the tags are uniquely represented (e.g., in platform 102) via a unique identifier (ID). The tag may be a human readable name for a set of stock (to be published to the locations in the geographical region(s) assigned to the queue or tag). In the example environment of FIG. 12, a tag with the human readable name "ACME Motors News—Midwestern" was created, and the flower show content is assigned to the tag. A piece of content may be associated with one or more tags.

The queue definition and addition of content (stock) to queues facilitated by managed services engine 1302 are passed to scheduler 1304. In some embodiments, scheduler 1304 is an alternate view of scheduler 516. For each local content publishing queue, the scheduler is configured to determine the set of locations that are included in the geographical region(s) assigned to a given queue. For example, scheduler 1304 determines the zip codes that correspond to the DMAs assigned to the queue (e.g., using a mapping of DMAs to zip codes). In some embodiments, the mapping of geographical regions assigned to queues and the zip codes that are included in the geographical regions are configurable and flexible. The queue (tag) is then associated with one or multiple zip codes.

In some embodiments, the local time zones for every zip code (e.g., cst, mountain, pst, pdt, Hawaii time, etc.) are determined.

In some embodiments, scheduler 1304 accesses location database 1306. Location database 1306 includes information about the tenants or locations that have, for example, subscribed to local content publishing. The information maintained by, or internal to, platform 102 for each subscribed location includes information such as the name and website of the location. The maintained information also includes a physical address for a location, which includes a corresponding zip code. The locations that are to be assigned to the queue (that should receive content added to the queue) can be determined by joining the locations and the geographical regions of the queue based on zip codes. Thus, applicable (e.g., geographically relevant) locations can be mapped or assigned to a given queue based on zip code allocation. An example data model for a queue or tag is described in further detail below.

In some embodiments, the scheduler processes multiple queues. Those queues that are determined to have zero locations are automatically removed (e.g., there are no tenants or subscribers in those locations, which may change over time). In some embodiments, no further scheduling processing is performed for those queues with zero locations.

As described above, users such as Charlie can use the managed services engine to view demand for queues (e.g., the amount of demand for the next several weeks). Users can also view the number of locations in the queue. Users can also add content to queues. In some embodiments, stock or content is saved to a stock table (e.g., stock manager 512), which is configured to keep track of current stock inventory.

When content is added to the queue, scheduler 1304 is configured to schedule the publishing or posting of the added content. For example, scheduler 1304 is configured to determine how to distribute the content across the various locations. In some embodiments, content must be published to all locations before expiration.

As one example of distributing content, as described above, the content can be spread evenly among the locations across the life of the content (before the content expires). For example, based on the start and end (expiration) dates of the content, scheduler 1304 determines the life of the content (e.g., number of days or any other appropriate unit of time). The number of locations assigned to the queue is then divided by the number of days that the content will be live. This results in a value that indicates, for each day of the life of the content, the number of locations on behalf of which the content should be published.

Based on the determination, scheduler 1304 can then schedule, for each day of the life of the content, what locations on behalf of which to publish the content. For example, suppose that the start day for the content is Jan. 1, 2016, and the end date for the content is Jan. 7, 2016 (seven day life of the content). Suppose that there are 14 locations assigned to the queue to which the content to be published was added. Scheduler 1304 determines, as described above, that the content should be published on behalf of two locations for each day of the life of the content (14 locations divided by seven days). Scheduler 1304 then schedules, for each day from Jan. 1, 2016 to Jan. 7, 2016, two locations on behalf of which the content will be published. For example, for the start day, Jan. 1, 2016, scheduler 1304 randomly selects two locations from the fourteen on behalf of which to publish the content. Stock has now been allocated to the two locations for the first day of the life of the content. The randomly selected two locations are then removed, as their requirement for content has been fulfilled (leaving 12 locations of the original 14). For the second day of the life of the content, Jan. 2, 2016, scheduler 1304 then again randomly selects another two locations from the remaining twelve locations. Scheduler 1304 continues this process until publishing of content is scheduled on behalf of all 14 locations assigned to the queue over the life of the content. Thus, the content will be distributed evenly across the locations across the content's life.

In some embodiments, when scheduling the publishing of content on behalf of a location, scheduler 1304 ensures that the content will be published at a particular or specific local time or time zone relative to the location. For example, if the content is to be published for locations at 3 pm local time, scheduler 1304 ensures that the content is published at the correct local time based on the time zone of the location (determined based on the zip code of the location, as described above).

An example of a data model for a stock-to-location allocation (e.g., scheduled allocation of content to a particular location) is described in further detail below.

Other processing can also be performed when scheduling publishing or posting of content, such as application of rules such as rules 510, as described above. For example, radii and reuse days, as described above, can be pre-calculated based on the number of locations assigned to a queue and the expiration date of content. For example, the radius for the content can be automatically computed when the content is created, as described above (e.g., when specifying a configurable distance for determining neighbors). The radius is applied to ensure, for example, that overlapping "neighbors" do not post the same content on the same day (or post the same content within a threshold number of days, etc.). Other examples of publishing rules that can be enforced include a rule that a location can only obtain one piece of content per day, and that a location cannot receive duplicate content.

Demand calculations can also be performed, as described above, based on whether content exists for queues, as well as content requirements for particular queues.

Once the publishing of the content on behalf of locations has been scheduled, in some embodiments, the requirement for content is decremented, as a piece of content has been fulfilled.

An example of a core algorithm for performing stock allocation and publishing scheduling is described in further detail below.

Figure 14:
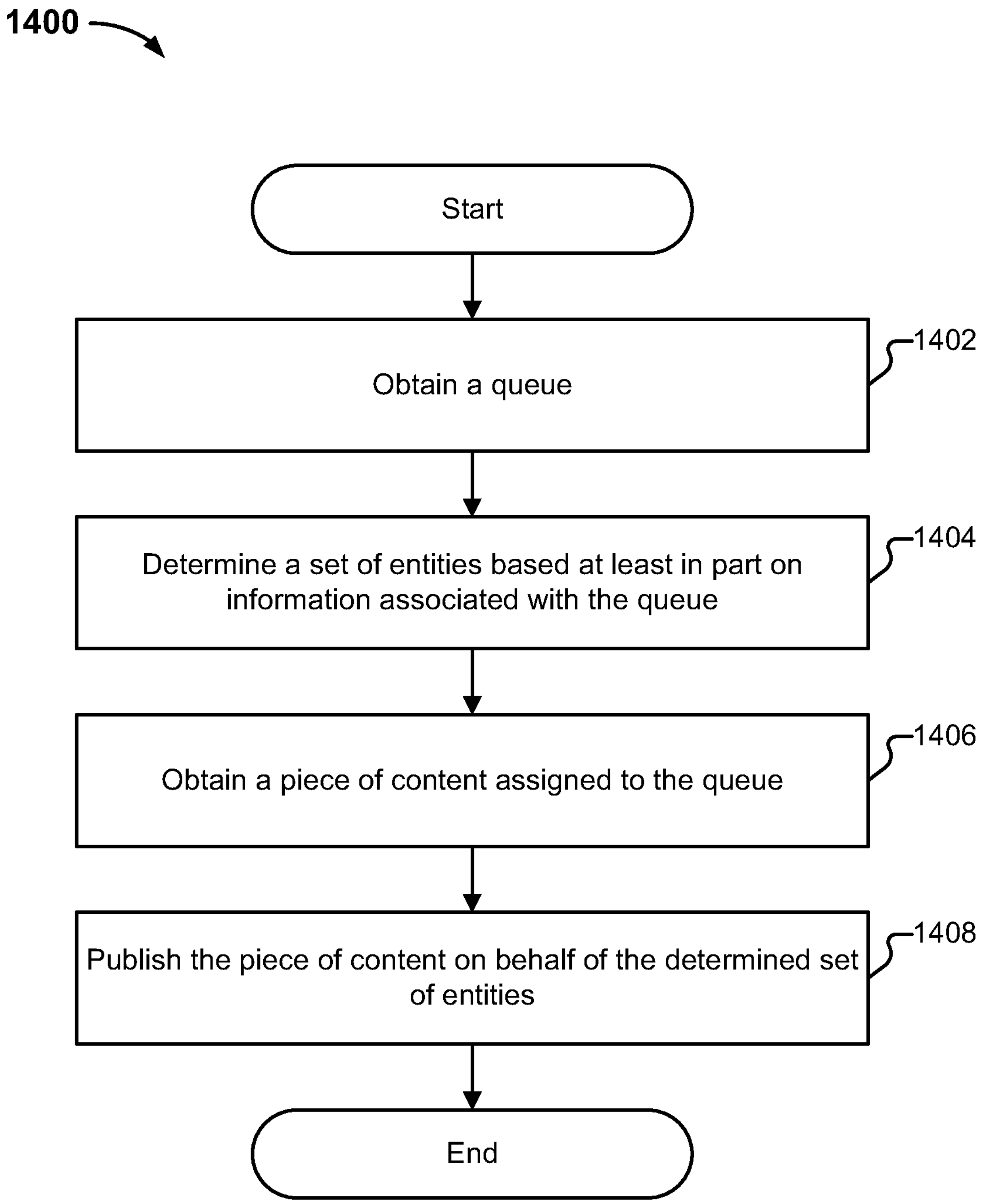
FIG. 14 is a flow diagram illustrating an embodiment of a process for local content publishing.

FIG. 14 is a flow diagram illustrating an embodiment of a process for local content publishing. In some embodiments, process 1400 is executed by platform 102. The process begins at 1402, when a queue is obtained. In some embodiments, a definition of a queue is obtained. In some embodiments, the queue is assigned one or more geographical regions. As one example, the queue is assigned, or corresponds to, one or more DMAs. As described, other aspects of the queue can be defined as well, such as a name and description of the queue (or the content to be placed in the queue). The queue can be defined via various interfaces, as described herein. In some embodiments, a user (e.g., Charlie) can selectively indicate the geographical regions that they would like to assign the queue. As another example, a user can be provided an option to select all available geographical regions to broadcast content to. As another example, a user can exclude geographical regions from receiving content by selecting all available geographical regions and then selectively excluding certain regions. As another example, the user can also selectively exclude which regions content should not be published to. Platform 102 will then automatically select all other available regions to assign to the queue, except for the excluded regions.

In some embodiments, the queue definition is associated with a set of zip codes. The zip codes may be determined based on the DMAs assigned to the queue. For example, in some embodiments, the DMA (or any other appropriate representation of a geographical region) includes a list of zip codes. The zip codes included in the DMAs are assigned to or associated with the queue.

At 1404, a set of entities (e.g., locations or rooftops) is determined based at least in part on information associated with the queue (e.g., the definition or configuration) of the queue. For example, a set of locations included in the one or more geographical regions associated with a queue definition are determined. For example, the zip codes associated with the queue are obtained (e.g., from the queue definition, based on what DMAs were assigned to the queue).

The zip codes of the locations, rooftops, or tenants maintained by platform 102 are also obtained (e.g., from stored location information). Those locations or rooftops that have zip codes that are in the DMAs (e.g., that have zip codes matching the zip codes in the DMAs) are assigned to the queue. In some embodiments, the time zones of the zip codes are also determined.

At 1406, a piece of content to be published is obtained. In some embodiments, the piece of content is assigned to the queue. In some embodiments, the piece of content includes a start date and an expiration date. The content can be marked as evergreen, indicating that it should be reused (e.g., periodically or in a time-driven basis). The content may also be marked as content that is to be published instantly. In other embodiments, a (local) publishing time is specified for the content. In some embodiments, the piece of content has been or is assigned to the queue.

At 1408, the piece of content is published on behalf of the determined set of entities. In some embodiments, publishing the content includes scheduling the publishing of the content on behalf of the locations assigned to the queue at 1404. As one example, and as described in conjunction with the example environment of FIG. 12, publishing of the content can be evenly distributed or spread across the locations across the life of the content. For example, the life of the content can be determined by subtracting the start date from the end date (e.g., subtracting UTC (coordinated universal time) and rounding to a number of days). The life of the content can be compared to the number of determined locations. For example, the number of determined locations is divided by the life of the content. This value can then be used to determine the number of locations that should receive the content each day of the life of the content. The publishing of the content is then scheduled. For example, for each day, a number of locations (determined based on the aforementioned distribution calculation) is randomly selected from the determined set of locations. In some embodiments, the content is published on behalf of the locations at the same local time. For example, using the time zone calculation described above, content can be scheduled to be published at the same local time for locations that may be in different zip codes (e.g., the content should be published at 2 pm, local time, for the various locations). The content on behalf of the locations is published according to the determined scheduling (where the scheduling may be performed in advance of the content's start date).

If the content is marked as being content that should be instantly published, the content can be immediately published to all applicable locations (e.g., in selected geographical regions). Time zone calculations and determinations can be overridden. If content is marked as evergreen, it can be re-placed into the relevant queues so that it can be republished and reused on a periodic basis.

FIG. 15 illustrates an example of pseudocode for selecting locations. In particular, as described above, when publishing stock, a number of locations on behalf of which content should be posted on a given day is selected, for example, randomly, from all locations assigned to a queue. In this example, "N" is the number of locations that should be selected, "L" is all of the locations that should be chosen from," and "A" is today's allocation.

FIG. 16 illustrates an example of pseudocode for allocating stock to locations. In some embodiments, the process is triggered at a specific time of day (e.g., a social curation CRON can be run at 7 am, daily, or at any other desired time). In this example, the process allocates stock on day D for a group of tenants.

Figure 17:
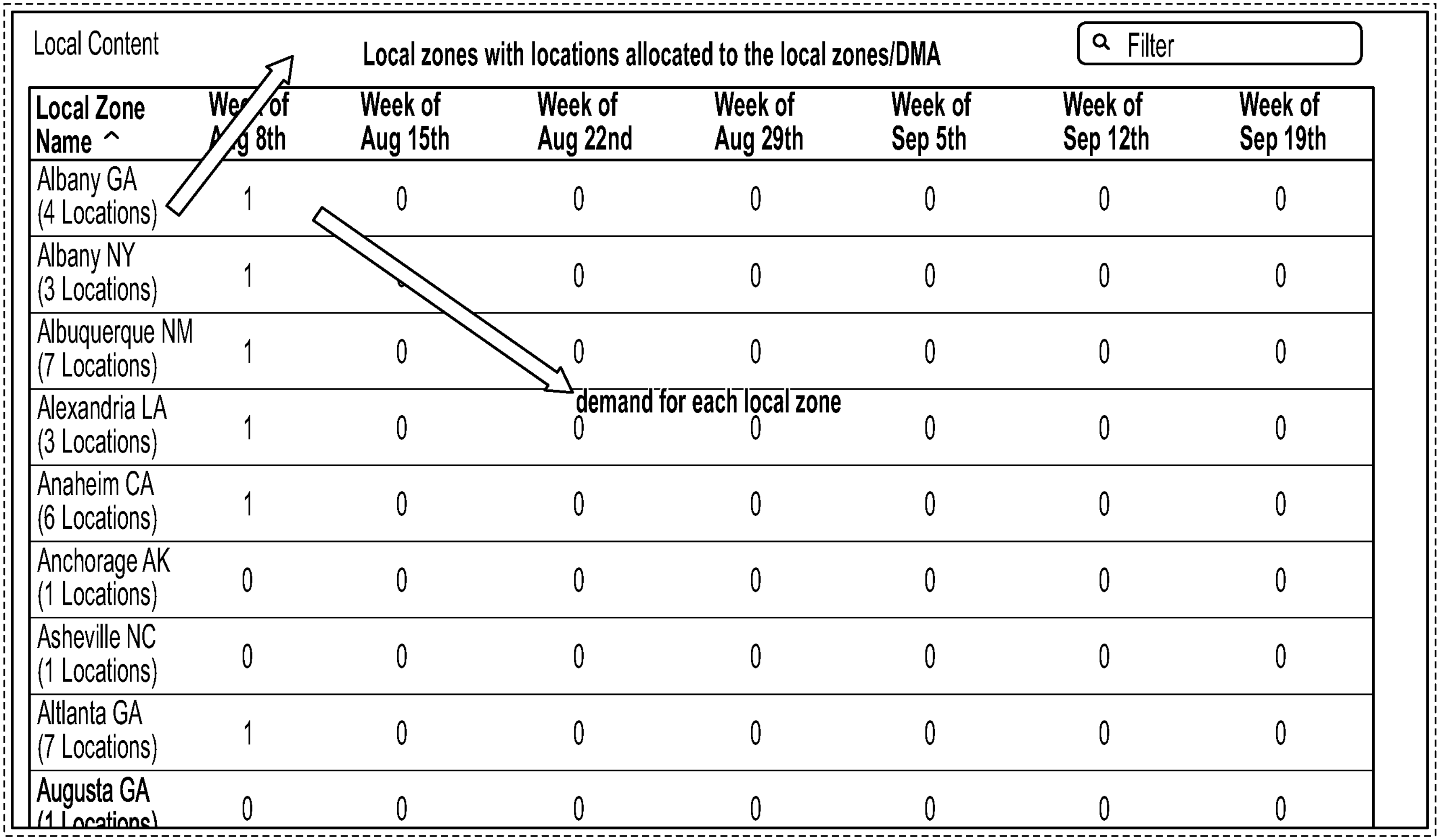
FIG. 17 illustrates an example embodiment of an interface for local content publishing.

FIG. 17 illustrates an example embodiment of an interface for local content publishing. In some embodiments, the interface is provided by managed services engine 1302. In some embodiments, queues are automatically selected based on DMAs. In this example, each DMA is assigned to a corresponding queue or tag for a given DMA (in other embodiments, a queue may include multiple DMAs). As described above, a DMA may include a list of zip codes. If a location has a matching zip code, the location is associated with that DMA. Each location can raise a demand for content. This content demand uplevels to the associated DMA as a content requirement for that DMA (i.e., a demand for content for a location is also treated as a demand for content for the DMA in which the location is included). In some embodiments, every DMA that has a content requirement greater than zero is included as a part of the demand. In the example shown are DMAs (also referred to as "local zones" in this example). The number of locations for each DMA is shown. The amount of content demand for each week is shown. Thus, in this example dashboard, a user may view queues, locations associated with queues, demand for a given time period, etc.

Figure 18:
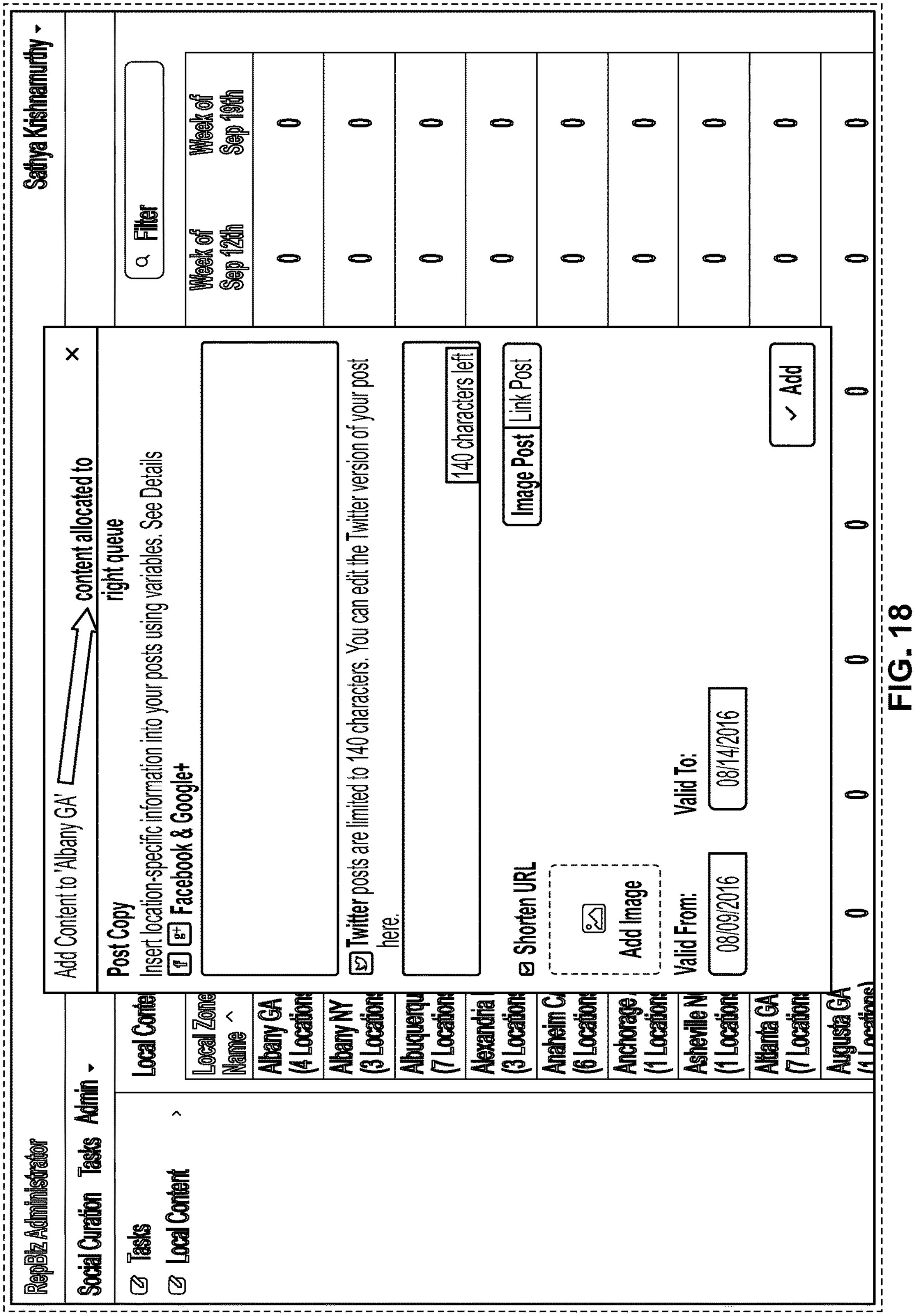
FIG. 18 illustrates an example embodiment of an interface for assigning content to a queue or tag.

FIG. 18 illustrates an example embodiment of an interface for assigning content to a queue or tag. In some embodiments, the interface is provided by managed services engine 1302. In some embodiments, each piece of content is associated with a specific tag, which maps to a queue name (which in turn corresponds to a geographical region or area (e.g., based on one or more assigned DMAs)). Thus, any content that is tagged with a queue name is automatically allocated to the queue. If a piece of content has multiple tags, then content is allocated to multiple queues. Content assigned to queues is then scheduled for publishing (and ultimately published according to the scheduling), as described above.

Example Data Models

Tag Data Model

The following is a first example data model for a virtual queue or tag. As shown in this example, the tag is associated with three zip codes.

```
[
  {
    "_id" : "535dbcb9454e3d15b0ab8faa",
    "description" : "Contains blog posts, press releases, and articles from Acme Motors, including photos, videos, and rich-media published by Acme Motors.",
    "tenantId" : 289,
    "name" : "Acme Motors News",
    "tagName" : "MD",
    "type" : "LOCAL",
```

-continued

"zipCodes" : [
"20851-1314",
"21117-1906",
"21014-5199"
]
},

The following is a second example of a data model for a queue or tag

{
"_id" : "53d7e6cde4b08b2bdf0e5fe9",
"description" : "Tips about how to use your product, expert tips on your product, or tips relating to your product or industry.",
"tenantId" : 289,
"name" : "Lux Car Tips",
"tagName" : "LA",
"type" : "LOCAL",
"zipCodes" : [
"20851-1314"
]
}
]

Stock Data Model

The following is an example embodiment of a data model for stock. As shown in this example, the stock is associated with a release date (before which the stock cannot be used) and an expiry date (after which the content cannot be re-used). Stock may be associated with one or more tags. In the below example, the stock is associated with a tag identifier for the second example tag data model described above. In some embodiments, the stock (content) is saved in a stock table which keeps track of current inventory of stock (e.g., using stock manager 512).

{
"_id" : "53da6119e4b08b2bdf0e6456",
"description" : "Lux Car Interface: Voice Recognition -- Calling Contacts",
"expiresDate" : "2015-01-01T08:00:00Z",
"releaseDate" : "2014-08-01T07:00:00Z",
"text" : "Connect with others easily using the voice recognition feature in your #Lux Car Interface.",
"socialnetworkContent": "Test Title 1 Social Network",
"tagIds" : ["53d7e6cde4b08b2bdf0e5fe9"],
"url" :
"https://www.onlinevids.com/watch?v=Y3Ymr6kBrIQ&index=4&list=PLXXOtTBF8wvhnT6b6ilPa81JQMbKw821J",
"imageUrl" : "http://www.example.com/1/image.png",
"groupIds" : [{" $oid":"5365565ff9224264509dc2f6"}],
"reUse" : 14
}

Content-to-Location Allocation Data Model

In some embodiments, when a piece of content is scheduled (or allocated) to a particular location, a data model such as the example data models described below is generated. In the examples shown, the data model stores information about the allocation, such as tag, location, stock, post data, and scheduled post identifier or exception. The scheduled post ID can be stored if the stock is allocated successfully (as shown in the first data model below). If allocation of the stock to the content fails, then an exception is stored (as shown in the second data model below). In some embodiments, the content-to-location allocation data model is used to detect duplication when assigning stock to a location (where, in some embodiments, duplicates are removed).

{
"_id" : {"$oid" : "560ebbd4300493be2621c7a7"},
"_class" :
"com.platform.rm34e.selection.domain.LocalContentAllocation",
"tenantId" : {"$numberLong": "1173"},
"locationId" : "1173_hideen",
"stockId" : {"$oid" : "536801807b67e70c54040be4"},
"postDate" : {"$date" : "2015-09-28T07:00:00Z"},
"schedulePostId" : "53da6119e4b08b2bdf0e6458"
}
{
"_id" : {"$oid" : "56059e03300470b7440b6ca4"},
"_class" :
"com.platform.rm34e.selection.domain.LocalContentAllocation",
"tenantId" : {"$numberLong": "1173"},
"locationId" : "1173_hideen",
"stockId" : {"$oid" : "536801807b67e70c54040be4"},
"postDate" : {"$date": "2015-09-24T17:20:56Z"},
"exception" : "SOCIAL_SERVER_NO_ID"
}

Content Variants

In the above examples with respect to local content publishing, the same piece of content is published across all locations assigned to the queue to which the content was added. In some embodiments, the curation team (e.g., which Charlie is a member of) creates new pieces of content with different variations (e.g., different verbiage) so that the same exact content is not published to all of the locations, but rather, different locations may have different variants of the content published on their behalf. The new pieces of content may then be added to different queues to ensure that each version of the content is sent to locations in a specific geographical region while other locations in other geographical regions will obtain the other versions of the content. Managing the different versions of content (which may be established as separate pieces of content) can be complicated, with the curation team required to remember which geographical regions are to receive what version of the content, how to schedule or pace the different content versions, having the correct version of the content being published, etc.

As will be described in further detail below, the techniques for generating content variants described herein can be used to efficiently generate and publish different variations of a piece of content on behalf of locations.

Returning to the example of the flower show content in the example environment of FIG. 12, suppose that the flower show event announcement is identified as the "main" content that is to be published. Variants for the identified main or primary content are then created. For example, suppose that the curation team creates variants A, B, and C of the main flower show announcement content. The different variants are tied to the same main content, and can have the same text and embedded link, but vary, for example, by having attached different images. As variants A, B, and C are variants of individual and independent main content (e.g., based on a same root/parent identifier, but different version identifiers), platform 102 treats the variants collectively as a single piece of content when performing scheduling and publishing. Different variants of the content will then be published on behalf of different locations.

For example, as described above, platform 102 schedules the distribution of the flower show content evenly among the 21 locations across the life of the content (e.g., three locations per day for each of the seven days of the life of the content). However, in this example scenario, rather than scheduling the same piece of content to be published to all the locations, different variants are assigned to the locations for publishing. For example, as there are three content variants and three locations selected for each day, each of the three locations will be assigned a different one of the three content variants (i.e., platform 102 will publish a different content variant on behalf of each of the three locations scheduled for a given day). In some embodiments, the assignment of variants to locations for publishing is rotated or cycled (e.g., the variants are published in sequence over the life of the content or any other time period for which a user wishes to have it published for a location or region(s)). For example, a first location will be assigned content variant A, a second location will be assigned content variant B, a third location will be assigned content variant C, a fourth location will be assigned content variant A (starting over at variant A after rotating or cycling through the variants), and so on.

In addition to local content publishing, content variants can also be used in content curation, for example, when determining how to post content for locations that are "neighbors," as described above. For example, different content variants can be applied to locations that are determined to be "neighbors" (within a radius of each other).

Various rules can also be used to govern or specify how content variants are to be distributed. For example, suppose that content variant B is to include a high resolution image. Charlie can add an additional rule indicating that this content variant, with a high resolution image, is only to be published on a source or service such as Instagram, but should not be published for any other sources. Similarly, suppose that content variant C includes a video. Charlie can specify a rule indicating that this content variant can be published to sources such as Facebook, Google+, and Youtube. Thus, rules can be added that specify options for indicating where (e.g., sources or services) certain variants should be published. Mixing and matching of multiple variants of content can also be performed for a variety of situations when publishing or posting content. Although there are multiple content variants, from a campaign perspective, the multiple variants are viewed as part of a single campaign.

Thus, different locations can receive different, unique, variants of content that are tied to the same content and convey the same message, but have a completely different look and feel (e.g., are perceived differently because they are about the same theme or content, but have differences such as different links, sources, images, etc.). As the content variants are collectively identified as a single piece of content by platform 102 (e.g., the variants are tied to a single content identifier), once the content is allocated to the locations (who will receive different variants), the content as a whole is considered as used.

The use of content variants provides various advantages. As described above, multiple locations will be prevented from having the exact same content published on their behalf, and instead, content that appears different (e.g., that has a different look and feel but is tied to the same content) will be published. Thus, a user visiting the social media pages for two different locations may see similar content, but not exactly the same content. Locations then do not need to worry about having the same content posted as other similar locations. Further, the effort of coordinating and managing the publishing of different content to different locations is reduced. For example, the distribution of the content variants is handled automatically by platform 102 (e.g., by schedulers 516 and 1304). Any additional rules such as those described above (e.g., specifying specific sources or services for publishing content) can be applied by platform 102 when it performs publishing. Also, the effort in creating content is reduced. For example, rather than having to completely create three new contents from scratch, Charlie can use the example interface 1900 of FIG. 19, described below, to quickly create variants of the same content. The advantages can scale rapidly, as the number of variants for a single piece of content grows. Using content variants, Charlie can quickly create a large number of variants of a piece of content (e.g., launch of a new invisible braces technology) that can be published across various geographical regions for tenants that are dentists, or published across the queues from which dentists' offices such as Dent-Detroit request content.

FIG. 19 illustrates an example embodiment of an interface for configuring content variants. In some embodiments, the interface is provided by managed services engine 1302. In the example shown, a content variant is being added. As shown, multiple content variants are supported within a single content creation flow or process. For example, in the single interface screen 1900, a user is able to configure different message variants applicable for different network services.

In this example, the primary content (also referred to herein as "copy") to be posted is related to a sneak peek for a new car. In some embodiments, different fields are provided for different variants, where a single variant may be used for multiple networking services. In some embodiments, the interface and its included elements that are rendered are based on the network services to which content is to be published.

In the example of FIG. 19, because Facebook and Google+ have the same posting requirements, the same variant of the copy can be published to the two different services. To minimize the amount of information entered by the user, a single field (1902) for capturing a version of the copy or content that is applicable to both Facebook and Google+ is rendered. Thus, a user need only enter this content variant once, and have the same content published to the two different network services (i.e., the user does not need to enter the same content twice for the two different services).

In this example, because Twitter has different requirements (e.g., where posts are limited to 140 characters), a separate field (1904) for entering or capturing a Twitter-specific variant or version of the content is rendered in the interface. In some embodiments, the field that is rendered is configured with rules that govern what can be entered into the field, where the rules for what may be entered may match the rules for allowed posts on the network service. For example, because Twitter posts are limited to 140 characters, field 1904 will not allow a user to enter more than 140 characters.

In some embodiments, when rendering the content variants interface (e.g., interface 1900), managed services engine 1302 is configured to determine the network services to which content is to be published. Based on the posting requirements or rules for the determined network services, the managed services engine determines a number of content variants that will need to be provided for user input, where each content variant will be associated with a corresponding field for capturing the content variant. As one example, the managed services platform aggregates or groups together services for which the same content variant can be shared or published (e.g., share the same or similar posting rules, such as with Facebook and Google+ in the example of FIG. 19). If a service has its own unique rules that are specific to the service and will require its own content variant, then it is placed in its own group (e.g., as in the case with Twitter above). Each group is then assigned a field for capturing the corresponding content variant that can be posted to the network services aggregated into the group. In the example of FIG. 19, Facebook and Google+ have been grouped together, and thus a single field for entering a single content variant that is applicable to both services is rendered at 1902. Because Twitter has its own unique requirements that are not shared with any other services, and is thus in its own group, a field for entering a content variant or version specific to Twitter is rendered at 1904.

In this example, location-specific information may be inserted into posts using variables. An option to enter short URLs is shown at 1906. Link posts and image posts may also be configured. A title and description for the URL may also be inputted. Images (e.g., custom images) may also be uploaded at 1908. Additional content can be added at 1910.

In some embodiments, tags for the content can be added at 1912. A campaign associated with the post copy may also be selected at 1914. A user may also select to which locations the content is to be visible at 1916. For example, the user can select specific locations (e.g., in a DMA) to which the content should be visible, exclude locations from seeing the content, allow all locations to see the content, etc. At 1918, the user is provided user interface options for cancelling or saving the copy or content to be posted (and the variants).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain one or more pieces of content from a content database;

add the one or more pieces of content to a queue that is associated with one or more geographical regions, wherein content in the queue is to be published on behalf of entities determined to be in the one or more geographical regions, and wherein the one or more pieces of content are added to the queue at least in part by assigning, to the one or more pieces of content, a tag identifying the queue;

identify a set of entities that are in the one or more geographical regions associated with the queue;

schedule publishing of the one or more pieces of content on behalf of the set of entities at least in part by:

determining a distribution of the one or more pieces of content across the set of entities over a life of the one or more pieces of content; and for at least two different entities on behalf of which content is to be published on a first portion of the life of the one or more pieces of content, assigning different content variants to the at least two different entities at least in part by assigning the different content variants to different queues, wherein the different content variants are collectively identified and handled as a single piece of content at least in part by associating the different content variants with a same parent content identifier; and publish the different content variants on behalf of the at least two different entities for the first portion of the life of the one or more pieces of content; and a memory coupled to the one or more processors and configured to provide the one or more processors with instructions.

2. The system of claim 1 wherein a geographical region includes a set of zip codes.

3. The system of claim 2 wherein the set of entities is identified based at least in part on the set of zip codes.

4. The system of claim 3 wherein identifying the set of entities includes accessing information associated with a plurality of entities, wherein information corresponding to an entity includes a zip code associated with the entity.

5. The system of claim 4 wherein the set of entities includes one or more entities in the plurality of entities that are associated with zip codes that match the set of zip codes assigned to the queue.

6. The system of claim 1 wherein the scheduling is based at least in part on a number of entities in the set of entities.

7. The system of claim 6 wherein the one or more pieces of content are evenly distributed among the set of entities based at least in part on the number of entities in the set of entities and the life of the one or more pieces of content.

8. The system of claim 1 wherein the publishing is based at least in part on local time zones associated with the set of entities.

9. The system of claim 1 wherein the one or more pieces of content are simultaneously published on behalf of the set of entities.

10. The system of claim 1 wherein the one or more pieces of content are published on a recurring basis.

11. A method, comprising:

obtaining one or more piece of content from a content database;

adding the one or more pieces of content to a queue that is associated with one or more geographical regions, wherein content in the queue is to be published on behalf of entities determined to be in the one or more geographical regions, and wherein the one or more pieces of content are added to the queue at least in part by assigning, to the one or more pieces of content, a tag identifying the queue;

identifying a set of entities that are in the one or more geographical areas associated with the queue;

scheduling publishing of the one or more pieces of content on behalf of the set of entities at least in part by:

determining a distribution of the one or more pieces of content across the set of entities over a life of the one or more pieces of content; and for at least two different entities on behalf of which content is to be published on a first portion of the life of the one or more pieces of content, assigning different content variants to the at least two different entities at least in part by assigning the different content variants to different queues, wherein the different content variants are collectively identified and handled as a single piece of content at least in part by associating the different content variants with a same parent content identifier; and publishing the different content variants on behalf of the at least two different entities for the first portion of the life of the piece of content.

12. The method of claim 11 wherein a geographical region includes a set of zip codes.

13. The method of claim 12 wherein the set of entities is identified based at least in part on the set of zip codes.

14. The method of claim 13 wherein identifying the set of entities includes accessing information associated with a plurality of entities, wherein information corresponding to an entity includes a zip code associated with the entity.

15. The method of claim 14 wherein the set of entities includes one or more entities in the plurality of entities that are associated with zip codes that match the set of zip codes assigned to the queue.

16. The method of claim 11 wherein the scheduling is based at least in part on a number of entities in the set of entities.

17. The method of claim 16 wherein the one or more pieces of content are evenly distributed among the set of entities based at least in part on the number of entities in the set of entities and the life of the one or more pieces of content.

18. The method of claim 11 wherein the publishing is based at least in part on local time zones associated with the set of entities.

19. The method of claim 11 wherein the one or more pieces of content are simultaneously published on behalf of the set of entities.

20. The method of claim 11 wherein the one or more pieces of content are published on a recurring basis.

21. A computer program product embodied in a non-transitory computer readable storage medium and comprising computer instructions for:

obtaining one or more piece of content from a content database;

adding the one or more pieces of content to a queue that is associated with one or more geographical regions, wherein content in the queue is to be published on behalf of entities determined to be in the one or more geographical regions, and wherein the one or more pieces of content are added to the queue at least in part by assigning, to the one or more pieces of content, a tag identifying the queue;

identifying a set of entities that are in the one or more geographical regions associated with the queue;

scheduling publishing of the one or more pieces of content on behalf of the set of entities at least in part by:

determining a distribution of the one or more pieces of content across the set of entities over a life of the one or more pieces of content; and for at least two different entities on behalf of which content is to be published on a first portion of the life of the one or more pieces of content, assigning different content variants to the at least two different entities at least in part by assigning the different content variants to different queues, wherein the different content variants are collectively identified and handled as a single piece of content at least in part by associating the different content variants with a same parent content identifier; and publishing the different content variants on behalf of the at least two different entities for the first portion of the life of the one or more pieces of content.

* * * * *